(12) United States Patent
Sakaue

(10) Patent No.: US 8,549,082 B2
(45) Date of Patent: Oct. 1, 2013

(54) ELECTRONIC MAIL SERVER WITH FUNCTION FOR PREVENTING RECEPTION OF SPAMS BY IMPROVED WHITE LIST SYSTEM

(76) Inventor: Mamoru Sakaue, Kanagawa (JP)

( * ) Notice: Subject to any disclaimer, the term of this patent is extended or adjusted under 35 U.S.C. 154(b) by 784 days.

(21) Appl. No.: 12/596,969

(22) PCT Filed: Apr. 28, 2007

(86) PCT No.: PCT/JP2007/059272
§ 371 (c)(1),
(2), (4) Date: Oct. 21, 2009

(87) PCT Pub. No.: WO2008/136127
PCT Pub. Date: Nov. 13, 2008

(65) Prior Publication Data
US 2010/0217810 A1    Aug. 26, 2010

(51) Int. Cl.
*G06F 15/16* (2006.01)
(52) U.S. Cl.
USPC .......................................................... 709/206
(58) Field of Classification Search
USPC .......................................................... 709/206
See application file for complete search history.

(56) References Cited

U.S. PATENT DOCUMENTS

| | | | | |
|---|---|---|---|---|
| 7,747,860 | B2 * | 6/2010 | Cunningham et al. | 713/170 |
| 7,761,567 | B2 * | 7/2010 | Haverkos | 709/224 |
| 2005/0044154 | A1 * | 2/2005 | Kaminski et al. | 709/206 |
| 2005/0044160 | A1 * | 2/2005 | McElligott | 709/207 |
| 2005/0114457 | A1 * | 5/2005 | Shih | 709/206 |
| 2005/0251861 | A1 * | 11/2005 | Cunningham et al. | 726/23 |
| 2006/0031306 | A1 * | 2/2006 | Haverkos | 709/206 |
| 2009/0210507 | A1 * | 8/2009 | Haverkos | 709/206 |
| 2011/0083166 | A1 * | 4/2011 | Katsikas | 726/4 |
| 2011/0088097 | A1 * | 4/2011 | Cunningham et al. | 726/26 |

FOREIGN PATENT DOCUMENTS

| | | |
|---|---|---|
| JP | 11-122416 | 4/1999 |
| JP | 2001-306455 A | 11/2001 |
| JP | 2002-351796 A | 12/2002 |
| JP | 2003-141043 A | 5/2003 |
| JP | 2003-196216 A | 7/2003 |
| JP | 2003-323379 A | 11/2003 |
| JP | 2004-094295 A | 3/2004 |
| JP | 2004-102352 A | 4/2004 |
| JP | 2004-252619 A | 9/2004 |
| JP | 2006-311283 A | 11/2006 |

OTHER PUBLICATIONS

International Search Report; PCT/JP2007/059272; Aug. 14, 2007.

* cited by examiner

*Primary Examiner* — Douglas Blair
(74) *Attorney, Agent, or Firm* — Studebaker & Brackett PC

(57) ABSTRACT

The invention provides an e-mail server, with which e-mails are communicated between a member belonging to the server and a communication mate of the member under the protection of function or performance for preventing SPAMs from being received by an improved white list system and e-mail addresses can be surely prevented from undesirably leaking out. The server comprises received e-mail filtering means for forming destruction judgment and delivery judgment on a received e-mail for causing the received e-mail to be delivered in accordance with a delivery permitting decision and transmission e-mail filtering means for conducting processing on a transmission e-mail by which a group of letters representing an e-mail address discordant with an addressee's e-mail address contained in the transmission e-mail is replaced with another group of letters representing an open e-mail address or eliminated.

7 Claims, 12 Drawing Sheets

ELECTRONIC MAIL SERVER WITH FUNCTION FOR PREVENTING RECEPTION OF SPAMS BY IMPROVED WHITE LIST SYSTEM

TECHNICAL FIELD

The present invention relates to an electronic mail server which is operative to transmit or receive electronic mails each provided with an electronic mail address under a condition wherein unwanted or unsolicited electronic mails are prevented from being delivered to members affiliated with the electronic mail server.

TECHNICAL BACKGROUND

Electronic mails (hereinafter, referred to as e-mails) have been communicated through the Internet, which is a standardized and global system of interconnected computer networks linking a great number of people worldwide, by users widely scattered from an initial or early stage of spread of the Internet. In a concrete practical manner of e-mail communication, each of users makes a membership registration contract with an e-mail service provider which carries on business with the operation of an e-mail server so as to become a member affiliated with the e-mail server and then makes access to the e-mail server on the contract by making use of a client program called MUA (Mail User Agent) installed in his or her own terminal apparatus (hereinafter, referred to as a member's terminal apparatus) to transmit or receive e-mails. (Hereinafter, "the member" means "the user" who has made the membership registration contract with the e-mail service provider.)

In the e-mail server which is used in a usual e-mail system wherein the member's terminal apparatus is constituted with a personal computer, a program called MTA (Mail Transfer Agent) for transmitting, receiving or transferring the e-mails, a program called MDA (Mail Delivery Agent) for delivering received e-mails to mailboxes (inner memory areas) each allotted to the member, a program called MRA (Mail Retrieval Agent) for transferring the received e-mails from the mailbox to the member's terminal apparatus, a program called MSA (Mail Submission Agent) for receiving e-mails from the member's terminal apparatus and so on are installed. The MTA is often divided into a MTA for transmission and a MTA for reception to be separately installed so that a situation wherein the MTA is used for illegitimate relay of the e-mails by a mailer of an unwanted or unsolicited e-mail (hereinafter, referred to as "a SPAM") as described later can be prevented from being brought about.

The member is authorized an account with which he or she is able to make access to the e-mail server to which he or she is affiliated. In the e-mail server, account validation for recognizing the account of the member is conducted in the SMTP (Simple Mail Transfer Protocol) validation system for preventing the account of the member from being illegitimately used by the mailer of the SPAM when the member's terminal apparatus is connected with the e-mail server. With the SMTP validation system, the account validation is conducted with information representing the account of the member and a password given to the member on the strength of an extended function of the SMTP whenever the member's terminal apparatus is connected with the e-mail server.

Usually, the member obtains information representing a domain name or an IP (Internet Protocol) address for the MTA and MRA from the e-mail service provider with which he or she has made the membership registration contract and further is provided with information representing his or her own account, the password and an e-mail address by the e-mail service provider. The e-mail address is represented in the form of "mailbox name @ domain name". The @ is so-called "at mark" ("at symbol"). The mailbox name is represented with a plurality of alphabetical letters peculiar to the account and placed to precede the @. The domain name is represented with a plurality of alphabetical letters peculiar to the e-mail service provider and placed to follow the @.

In the case where the member receives an e-mail from one of communication mates, for example, first, the member notifies the communication mate of his or her e-mail address, and then, the communication mate transmits the e-mail directed to the member's e-mail address through an e-mail server of an e-mail service provider with which the communication mate has made a membership registration contract to the e-mail server of the e-mail service provider with which the member has made the membership registration contract. In this case, the MRA in the e-mail server of the e-mail service provider with which the member has made the membership registration contract is operative to transfer the e-mail transmitted from the communication mate to the MUA installed in the member's terminal apparatus connected with the e-mail server of the e-mail service provider with which the member has made the membership registration contract, so that the e-mail transmitted from the communication mate can be read by the member. The connection of the member's terminal apparatus with the e-mail server of the e-mail service provider is allowed when the account validation is successfully conducted with the information representing the account of the member and the password given to the member.

In the meanwhile, in the case where the member transmits an e-mail to one of communication mates, for example, first, the member obtains the e-mail address of the communication mate, and then, the member transmits the e-mail directed to the e-mail address of the communication mate through the e-mail server of the e-mail service provider with which the member has made the membership registration contract to an e-mail server of an e-mail service provider with which the communication mate has made a membership registration contract. In this case, the MRA in the e-mail server of the e-mail service provider with which the communication mate has made the membership registration contract is operative to transfer the e-mail transmitted from the member to the MUA in an e-mail terminal apparatus of the communication mate connected with the e-mail server of the e-mail service provider with which the communication mate has made the membership registration contract, so that the e-mail transmitted from the member can be read by the communication mate.

Incidentally, in the case of a kind of e-mail called usually a web mail, a web browser installed in the member's terminal apparatus serves as the MUA and the MTA and MRA are installed in a web server. Further, in the case of an e-mail communicated through portable telephones (mobile phones), the MUA is installed in a member's portable telephone.

The substance of the e-mail is an electronic message constituted with a header portion containing various kind of information representing a source e-mail address, a destination e-mail address, an e-mail address for reply and so on and a body portion containing an electronic information message and an attached electronic file. When the e-mail is transferred from the MUA to the MTA or from the MTA to the MUA, an envelope containing a sender's e-mail address and an addressee's e-mail address is added to the e-mail.

The addressee's e-mail address contained in the envelope is set automatically by the MUA or the MTA. Although an e-mail address identical with the destination e-mail address is usually set as the addressee's e-mail address, it is not necessarily so.

When the member receives the e-mail from the e-mail server, he or she is can not obtain directly the addressee's e-mail address. Since the addressee's e-mail address is self-explanatory to the member, it does not bring about any problem that the member who receives the e-mail from the e-mail server can not obtain directly the addressee's e-mail address.

The sender's e-mail address contained in the envelope is also set automatically by the MUA or the MTA. Although an e-mail address identical with the source e-mail address is usually set as the sender's e-mail address, it is not necessarily so. The source e-mail address is voluntarily described by the sender for convenience' sake of the addressee and not indispensable to the delivery of the e-mail.

When the member receives the e-mail from the e-mail server, he or she is can not obtain directly the sender's e-mail address. The sender is usually confirmed with the source e-mail address.

In general, the e-mail service provider provides each of the members with a plurality of e-mail addresses within a predetermined number. The e-mail address given to the member is notified to others mainly in the manner of a direct notice, an indirect notice, a notice through database registration, a notice through mailing list registration or a public notice.

In the case of the direct notice, for example, an e-mail address of a member A is directly notified by the member A to an acquaintance B of the member A. As a result, the member A is able to receive an e-mail from the acquaintance B.

In the case of the indirect notice, for example, the e-mail transmitted from the member A having his or her own e-mail address to the acquaintance B of the member A is further transferred from the acquaintance B to an acquaintance C of the acquaintance B, so that the e-mail address of the member A is notified to the acquaintance C of the acquaintance B. As a result, the member A is able to receive an e-mail also from the acquaintance C of the acquaintance B.

In the case of the notice through database registration, for example, the member A having his or her own e-mail address notifies a dealer D of the e-mail address to be registered on a database managed by the dealer D in order to receive a communication from the dealer D when he or she wants to purchase a product supplied by the dealer D, and then, the e-mail address of the member A is notified through the database managed by the dealer D to others belonging to the database.

In the case of the notice through mailing list registration, for example, the member A having his or her own e-mail address registers the e-mail address in a mailing list wherein e-mail addresses of specific members are registered in order to make information exchanges among the specific members, and then, the e-mail address of the member A is notified to all the specific members each having the e-mail address registered in the mailing list through the following transmission and reception of the electronic mail messages. In general, when one of the specific members each having the e-mail address registered in the mailing list transmits the e-mail directed to the e-mail address of the mailing list, the e-mail thus transmitted is delivered to all the specific members each having the e-mail address registered in the mailing list. Such an e-mail is usually provided with the e-mail address of the mailing list as the e-mail address for reply. Further, the destination e-mail address is not changed usually and therefore each of the specific members each having the e-mail address registered in the mailing list receives the e-mail provided with the e-mail address of the mailing list as the destination e-mail address. In addition, the source e-mail address is also not changed usually and therefore the e-mail address of the sender of the e-mail directed to the e-mail address of the mailing list is notified to all the specific members each having the e-mail address registered in the mailing list.

In the case of the public notice, for example, the member A having his or her own e-mail address establishes his or her own web site to manage the same and opens his or her e-mail address to the public in the web site, so that the e-mail address of the member A is notified to many and unspecific persons each making access to the web site managed by the member A. As a result, the member A can receive e-mail messages from many and unspecific persons.

After the member's e-mail address has been notified to others as mentioned above, an undesirable person is able to know also the member's e-mail address through a route which is not under the control by the member. Accordingly, it is likely that a large number of SPAMs including advertising e-mails which are automatically transmitted to unspecified e-mail addresses without confirming addressee's intention of receiving the same and wicked e-mails veiling fraudulent intentions are delivered to the member's e-mail address. Further, it is also likely that the SPAMs transmitted to addressee's e-mail addresses listed irresponsibly are delivered to the member's e-mail address which is accidentally identical with one of the addressee's e-mail addresses listed irresponsibly. These SPAMs delivered to the member's e-mail address inflict serious damages on the member. For example, the member is subjected to a lowering of working efficiency, oversights of necessary e-mails, fraudulent practices, an increase in cost for communications through a portable telephone brought about by receiving useless packets and so on by the SPAMs delivered to the member's e-mail address.

There have been previously proposed various kinds of measures against such SPAMs as mentioned above. In one of the previously proposed measures against the SPAMs, e-mails each containing predetermined key words are judged to be SPAMs and refused by the MTA. In the case where such a measure against the SPAMs is adopted, if a criterion for judgment of the SPAM is severely set, a problem that a necessary e-mail which is not the SPAM is wrongly judged to be the SPAM so as to be refused by the MTA is brought about. Further, in this case, there is room for allowing a SPAM mailer to transmit a SPAM which pretends a normal e-mail to be received by many and unspecified persons.

In another of the previously proposed measures against the SPAMs, e-mails each transmitted from a specific source e-mail address are judged to be the SPAMs and refused by the MTA. In the case where such a measure against the SPAMs is adopted, a black list on which e-mail addresses of specific persons who are deemed SPAM mailers are registered is provided and e-mails each having a source e-mail address identical with the e-mail address registered on the black list are judged to be SPAM and refused by the MTA. In this case, first the reception of a relatively large number of SPAMs is confirmed at least once and then the e-mail addresses identical with the source e-mail addresses of the SPAMs are registered on the black list. Therefore, there is a problem that the measure against the SPAMs is undesirably forestalled.

In addition, there has been also proposed a supplemental measure against the SPAMs wherein the member is provided with a plurality of e-mail addresses from the e-mail service provider and uses the e-mail addresses each in its proper way. When a predetermined number of SPAMs each directed to one or more of the e-mail addresses given to the member have been received, the one or more e-mail addresses are discontinued and one or more new e-mail addresses are provided in place of the discontinued e-mail addresses. Each of the e-mail addresses given to the member is under the member's own management.

For the purpose of improvement in efficiency of the measure against the SPAMs wherein each e-mail address is used in its proper way, it has been continued to develop measures for managing unitarily corresponding relations each between each of the e-mail addresses given to the member and a communication mate. In one of such measures already developed, for example, variable e-mail addresses each having a mailbox name containing a variable portion corresponding to a single communication mate or a communication mate in the form of a group of persons and hard to analogize are provided and the management of the corresponding relation between each of the variable e-mail addresses and each of the communication mates is carried out in the e-mail server or the member' terminal apparatus so that the corresponding relation between each of the variable e-mail addresses and each of the communication mates is linked to the information of the communication mate recorded in a communication history, an address note and so on (as disclosed in, for example, patent document 1).

Such a measure as disclosed in patent document 1 belongs to a white list system wherein a white list on which specific e-mail addresses listed up are registered is provided and only an e-mail from a source e-mail address identical with one of the e-mail address registered on the white list is permitted to be received. The measure against the SPAMs of the white list system is highly efficient in function or performance for preventing the SPAMs from being received. However, in practice, there is a problem that the member has to carry out continuously a complicated management of corresponding relations each between the member's e-mail address and each of the e-mail addresses of the communication mates. Further, there is another problem in the case where each e-mail address given to the member is used in its proper way for each communication mate that the member's e-mail address must be notified to each of the communication mates in the manner secret to a third party, that is, the member's e-mail address must be surely prevented from leaking out.

To solve the problems mentioned above, there have been further proposed several improved measures against the SPAMs. In one embodiment of the improved measures previously proposed, a source e-mail address contained in a header portion of an e-mail is converted into an e-mail address registered previously for each communication mate (as disclosed in, for example, patent document 1). In another embodiment of the improved measures previously proposed, a center e-mail server for supplying the member with e-mail addresses and notifying communication mates of the member of the e-mail addresses given to the member is established (as disclosed in, for example, patent document 2). In a further embodiment of the improved measures previously proposed, in addition to provision of variable e-mail addresses used in the white list system, fixed e-mail addresses each having a mailbox name containing a fixed portion to which a pass code for receiving an e-mail from an unspecified person is set are provided and an e-mail directed to the fixed e-mail address is permitted to be received only when a pass code transmitted together with the e-mail directed to the fixed e-mail address is identical with the pass code set to the mailbox name of the fixed e-mail address (as disclosed in, for example, patent document 3).

Patent document 1: Japanese Patent Publication No. 2003-196216
Patent document 2: Japanese Patent Publication No. 2003-323379
Patent document 3: Japanese Patent Publication No. 2004-102352

DISCLOSURE OF THE INVENTION

Problems Intended to be Solved by the Invention

With regard to the e-mail server operative to transmit or receive the e-mails each provided with the e-mail address as mentioned above, it is required desirably to be highly efficient in function or performance for preventing the SPAMs from being received by means of the white list system so that the problems described above are solved and further for preventing the member's e-mail addresses from leaking out. However, there has not been any e-mail server proposed previously which meets the requirement.

For example, the e-mail server in which the previously proposed measure disclosed in the patent document 1 or 3 is adopted is highly efficient in function or performance for preventing the SPAMs from being received by means of the white list system wherein the e-mails are exchanged only between the member and the specified communication mates. However, with such an e-mail server, for example, in the case where the e-mails are exchanged among member a belonging to the e-mail server, acquaintance b of the member a and acquaintance c of the member a or the acquaintance b, when the acquaintance c, who has known the e-mail address of the member a by means of receiving previously the e-mail exchanged between the member a and the acquaintance b and then transferred to the acquaintance c, intends to transfer an e-mail directly to the member a for the first time, it is necessary that the member a obtains a new e-mail address for receiving the e-mail directly from the acquaintance c and notifies the acquaintance c of the new e-mail address and thereby it is feared that rapid and smooth communication between the member a and the acquaintance c is obstructed.

Further, when the acquaintance b has a plurality of e-mail addresses for his home, his place of work and so on, it is required that the member a registers on the white list the e-mail addresses of the acquaintance b and e-mail addresses each corresponding to one of the e-mail addresses of the acquaintance b for receiving e-mail messages from the acquaintance b and thereby it is feared also that rapid and smooth communication between the member a and the acquaintance b is obstructed.

In addition, when the member transmits an e-mail directed to the e-mail address of the mailing list which is provided to the member in the manner previously proposed (such a transmission is referred to as a contribution to the mailing list), this contribution to the mailing list results in that the member's e-mail address leaks out undesirably. Therefore, a disadvantage that it is substantially impossible for the member to make the contribution to the mailing list under the protection of function or performance for preventing the SPAMs from being received is brought about.

Especially, in the e-mail server in which the previously proposed measure disclosed in the patent document 3 is adopted, there is a problem that the MUA installed in the e-mail terminal apparatus of the communication mate is required to have extended function to transmit the pass code for receiving the e-mail from the unspecified person, compared with the function of an ordinary MUA.

Besides, with the e-mail server in which the previously proposed measure disclosed in the patent document 1 or 3 is adopted, when one or more e-mail addresses which have been notified to only specified communication mates is caused to be contained in the header portion or the body portion of the e-mail on the occasion of transferring the e-mail received by the member to any other destination e-mail address or on the occasion of returning the e-mail received by the member to e-mail addresses for reply, the member's e-mail address or e-mail addresses of others notified to only the specified communication mates leak out undesirably.

Accordingly, it is an object of the present invention to provide an e-mail server operative to transmit or receive e-mails, with which the e-mail can be rapidly and smoothly communicated between a member belonging to the e-mail server and a communication mate of the member, the member can make a contribution to a mailing list under the protection of function or performance for preventing the SPAMs from being received by an improved white list system, and the member's e-mail address or e-mail addresses of others can be surely prevented from undesirably leaking out.

In this specification, the following definitions of wordings or phrases are provided to be reflected to the descriptions read hereinafter.

A peculiar open e-mail address means an e-mail address which has a mailbox name containing a peculiar portion corresponding to an account and independent of communication mates.

A variable open e-mail address means an e-mail address which has a mailbox name containing a peculiar portion corresponding to an account and a variable portion corresponding to a group of e-mail addresses of communication mates.

An e-mail address for communication mate validation (a communication mate validation e-mail address) means an e-mail address which has a mailbox name containing a variable portion corresponding to a group of e-mail addresses of communication mates and corresponds indefinitely to an account.

An e-mail address for validation in the time renewal system (a time renewal validation e-mail address) means an e-mail address which has a mailbox name contained a variable portion renewed at intervals of predetermined time and corresponds indefinitely to an account.

Approach to Solve the Problems

According to a first aspect of the present invention, there is provided an e-mail server comprising e-mail receiving means for receiving e-mails, received e-mail filtering means for passing judgment on the e-mail received by the e-mail receiving means, e-mail delivering means for delivering the e-mail having been subjected to the judgment by the received e-mail filtering means to one of mailboxes corresponding respectively to accounts in a mailbox portion, and e-mail transferring means for transferring the e-mail delivered to the mailbox to a member's terminal apparatus, wherein the received e-mail filtering means is operative to form a destruction judgment for deciding whether the e-mail received by the e-mail receiving means is to be destroyed or not and then form a delivery judgment for deciding whether the e-mail received by the e-mail receiving means is to be delivered or not on the strength of an addressee's e-mail address of the e-mail received by the e-mail receiving means and at least one of a sender's e-mail address, an e-mail address for reply and a destination e-mail address contained in the e-mail received by the e-mail receiving means, and the e-mail delivering means is operative to deliver the e-mail decided to be not destroyed as a result of the destruction judgment and further to be delivered as a result of the delivery judgment to the mailbox in the mailbox portion which corresponds to the account provided with an e-mail address identical with the addressee's e-mail address.

Especially, in an embodiment of e-mail server according to the first aspect of the present invention, a database portion containing a mate's e-mail address database on which a group of e-mail addresses given to each communication mate are registered is provided in addition to the e-mail receiving means, the received e-mail filtering means, the e-mail delivering means and the e-mail transferring means, and the received e-mail filtering means is operative to make a delivery permitting decision for causing the e-mail received by the e-mail receiving means to be delivered when one of the group of e-mail addresses given to the communication mate and registered on the mate's e-mail address database, which corresponds to the addressee's e-mail address of the e-mail received by the e-mail receiving means, is identical with at least one of the source e-mail address, the e-mail address for reply and the destination e-mail address contained in the e-mail received by the e-mail receiving means.

According to a second aspect of the present invention, there is provided an e-mail server comprising member's e-mail receiving means for receiving e-mails from members each transmitted by a member' terminal apparatus, transmission e-mail filtering means for performing various kinds of e-mail processing including the processing on the e-mail from the member received by the member's e-mail receiving means which is dealt with as a transmission e-mail, and e-mail transmitting means for transmitting the e-mail having been subjected to the e-mail processing by the transmission e-mail filtering means, wherein the transmission e-mail filtering means is operative to conduct an e-mail address replacement proceeding for replacing a first group of letters representing an e-mail address which is contained in the transmission e-mail and not identical with an addressee's e-mail address of the transmission e-mail with a second group of letters representing another e-mail address which is able to be open to a communication mate who has an addressee's e-mail address of an e-mail from an account provided with the e-mail address represented by the first group of letters or an e-mail address elimination proceeding for eliminating the group of letters representing the e-mail address which is contained in the transmission e-mail and not identical with the addressee's e-mail address of the transmission e-mail.

Especially, in an embodiment of e-mail server according to the second aspect of the present invention, a database portion containing a black list database on which e-mail addresses given to a specified communication mate whose e-mail are to be refused to receive are registered is provided in addition to the member's e-mail receiving means, the transmission e-mail filtering means and the e-mail transmitting means, and the transmission e-mail filtering means is operative to perform the e-mail address elimination processing for eliminating a group of letters representing a peculiar open e-mail address or a variable open e-mail address which is contained in the transmission e-mail and not identical with the addressee's e-mail address of the transmission e-mail when the addressee's e-mail address of the transmission e-mail belongs to the e-mail addresses registered on the black list database corresponding to an account provided with the e-mail address represented by the group of letters.

Further, in another embodiment of e-mail server according to the second aspect of the present invention, a database portion containing a black list database on which e-mail addresses given to a specified communication mate whose e-mails are to be refused to receive are registered and a variable open e-mail address database on which a variable open e-mail address corresponding to e-mail addresses given to each communication mate is provided in addition to the member's e-mail receiving means, the transmission e-mail filtering means and the e-mail transmitting means, and the transmission e-mail filtering means is operative to perform the e-mail address replacement processing for replacing a first group of letters representing a variable open e-mail address which is contained in the transmission e-mail and not identical with the addressee's e-mail address of the transmission e-mail with a second group of letters representing another variable open e-mail address given to a communication mate when the addressee's e-mail address of the transmission e-mail does not belong to the e-mail addresses registered on the black list database corresponding to an account provided with the e-mail address represented by the first group of letters and the variable open e-mail address given to the communication mate which corresponds to e-mail addresses given to the communication mate to which the addressee's e-mail address of the transmission e-mail belongs is registered on the variable open e-mail address database corresponding to the account provided with the e-mail address represented by the first group of letters.

In the e-mail server according to the first aspect of the present invention constituted as described above, when the e-mail is received, the destruction judgment and the delivery judgment on the received e-mail are formed on the strength of the addressee's e-mail address of the received e-mail and at least one of the sender's e-mail address, the e-mail address for reply and the destination e-mail address contained in the received e-mail. Then, the received e-mail is delivered to the mailbox in the mailbox portion which corresponds to the account provided with the e-mail address identical with the addressee's e-mail address when the destruction judgment results in that the received e-mail is to be not destroyed and further the delivery judgment results in that the received e-mail is to be delivered.

In the embodiment of e-mail server according to the first aspect of the present invention, the delivery permitting decision is made for causing the received e-mail to be delivered when one of the group of e-mail addresses given to the communication mate registered on the mate's e-mail address database, which corresponds to the addressee's e-mail address of the received e-mail, is identical with at least one of the source e-mail address, the e-mail address for reply and the destination e-mail address contained in the received e-mail.

Accordingly, only the received e-mail, on which the delivery permitting decision has been made, is delivered to the mailbox and then transferred to the member' terminal apparatus.

In the e-mail server according to the second aspect of the present invention constituted as described above, the e-mail address replacement proceeding or the e-mail address elimination proceeding is conducted. In the e-mail address replacement proceeding, the first group of letters representing the e-mail address which is contained in the transmission e-mail and not identical with the addressee's e-mail address of the transmission e-mail are replaced with the second group of letters representing another e-mail address which is able to be open to the communication mate who has the addressee's e-mail address of the e-mail from the account provided with the e-mail address represented by the first group of letters. In the e-mail address elimination proceeding, the group of letters representing the e-mail address which is contained in the transmission e-mail and not identical with the addressee's e-mail address of the transmission e-mail are eliminated.

In the embodiment of e-mail server according to the second aspect of the present invention, the e-mail address elimination processing for eliminating the group of letters representing the peculiar open e-mail address or the variable open e-mail address which is contained in the transmission e-mail and not identical with the addressee's e-mail address of the transmission e-mail is performed when the addressee's e-mail address of the transmission e-mail belongs to the e-mail addresses registered on the black list database corresponding to the account provided with the e-mail address represented by the group of letters.

Further, in the embodiment of e-mail server according to the second aspect of the present invention, the e-mail address replacement processing for replacing the first group of letters representing the variable open e-mail address which is contained in the transmission e-mail and not identical with the addressee's e-mail address of the transmission e-mail with the second group of letters representing another variable open e-mail address given to the communication mate is performed when the addressee's e-mail address of the transmission e-mail does not belong to the e-mail addresses registered on the black list database corresponding to the account provided with the e-mail address represented by the first group of letters and the variable open e-mail address given to the communication mate which corresponds to e-mail addresses given to the communication mate to which the addressee's e-mail address of the transmission e-mail belongs is registered on the variable open e-mail address database corresponding to the account provided with the e-mail address represented by the first group of letters.

After that, the e-mail having been subjected to the e-mail address replacement processing or the e-mail address elimination processing is transmitted, so that the transmission of the e-mail from the member transmitted by the member's terminal apparatus is carried out.

Effect and Advantages of the Invention

In the e-mail server according to the first aspect of the present invention, as described above, the destruction judgment and the delivery judgment on the received e-mail are formed on the strength of the addressee's e-mail address of the received e-mail and at least one of the sender's e-mail address, the e-mail address for reply and the destination e-mail address contained in the received e-mail, and then the received e-mail is delivered to the mailbox in the mailbox portion which corresponds to the account provided with the e-mail address identical with the addressee's e-mail address when the destruction judgment results in that the received e-mail is to be not destroyed and further the delivery judgment results in that the received e-mail is to be delivered. After that, only the received e-mail, on which the delivery permitting decision has been made, is delivered to the mailbox and then transferred to the member' terminal apparatus. Accordingly, with the e-mail server according to the first aspect of the present invention, the e-mail can be rapidly and smoothly communicated between the member belonging to the e-mail server and the communication mate of the member, and further the member can make the contribution to the mailing list under the protection of function or performance for preventing the SPAMs from being received by the improved white list system.

In the e-mail server according to the second aspect of the present invention, as described above, the e-mail address replacement proceeding for replacing the first group of letters representing the e-mail address which is contained in the transmission e-mail and not identical with the addressee's e-mail address of the transmission e-mail with the second group of letters representing another e-mail address which is able to be open to the communication mate who has the addressee's e-mail address of the e-mail from the account provided with the e-mail address represented by the first group of letters or the e-mail address elimination proceeding for eliminating the first group of letters representing the e-mail address which is contained in the transmission e-mail and not identical with the addressee's e-mail address of the transmission e-mail, is conducted. After that, the e-mail having been subjected to the e-mail address replacement processing or the e-mail address elimination processing is transmitted, so that the transmission of the e-mail from the member transmitted by the member's terminal apparatus is carried out. Accordingly, with the e-mail server according to the second aspect of the present invention, the member's e-mail address or e-mail addresses of others can be surely prevented from undesirably leaking out when the e-mail from the member transmitted by the member's terminal apparatus is further transmitted.

DESCRIPTION OF REFERENCES IN THE DRAWINGS

11 . . . e-mail server, 12 . . . e-mail receiving means, 13 . . . received e-mail filtering means, 14 . . . e-mail delivering means, 15 . . . mailbox portion, 16 . . . e-mail transferring means, 17 . . . member's e-mail receiving means, 18 . . . transmission e-mail filtering means, 19 . . . e-mail transmitting means, 20 . . . database portion

MODE MOST PREFERABLE FOR WORKING OF THE INVENTION

A mode most preferable for the working of the present invention will be explained with an embodiment of the first and second aspects of the present invention described below.

Embodiment

Figure 1:
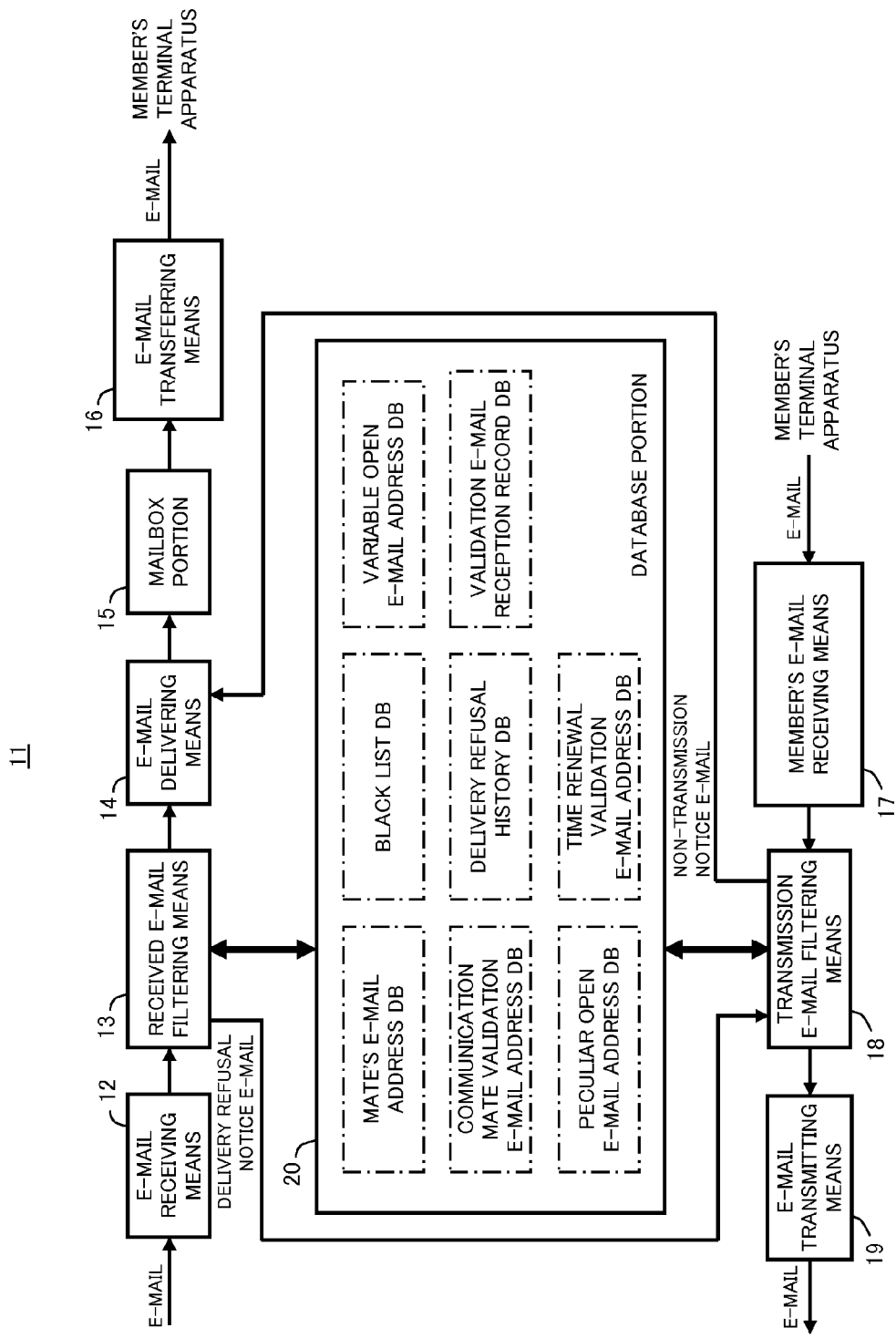
FIG. 1 is a schematic block diagram showing one embodiment of e-mail server according to the first and second aspects of the present invention.

FIG. 1 shows an example of an e-mail server according to the first and second aspects of the present invention.

Referring to FIG. 1, an e-mail server 11, which constitutes the example of the e-mail server according to the first and second aspects of the present invention, comprises e-mail receiving means 12 for receiving e-mails, received e-mail filtering means 13 for passing judgment on the e-mail received by the e-mail receiving means 12 which is dealt with as a received e-mail, e-mail delivering means 14 for delivering the e-mail having been subjected to the judgment by the received e-mail filtering means 13 to one of mailboxes corresponding respectively to accounts in a mailbox portion 15, and e-mail transferring means 16 for transferring the e-mail delivered to the mailbox to a member's terminal apparatus.

In the e-mail receiving means 12, an MTA for reception is installed and each e-mail is received by the MTA for reception. In the e-mail delivering means 14, an MDA is installed and the e-mail having been subjected to the judgment by the received e-mail filtering means 13 is delivered by the MDA to the mailbox corresponding to each account. Further, in the e-mail transferring means 16, an MRA is installed and the e-mail delivered to the mailbox is transferred by the MRA to the member's terminal apparatus in which an MUA is installed.

The e-mail server 11 further comprises member's e-mail receiving means 17 for receiving e-mails from members each transmitted by a member' terminal apparatus, transmission e-mail filtering means 18 for performing various kinds of e-mail processing including the processing on the e-mail from the member received by the member's e-mail receiving means 17 which is dealt with as a transmission e-mail, and e-mail transmitting means 19 for transmitting the e-mail having been subjected to the e-mail processing by the transmission e-mail filtering means 18.

In the member's e-mail receiving means 17, an MSA is installed and each electronic mail message from the member transmitted by the member' terminal apparatus is received by the MSA. In the e-mail transmitting means 19, an MTA for transmission is installed and the electronic mail message having been subjected to the e-mail processing by the transmission e-mail filtering means 18 is transmitted by the MTA for transmission.

The e-mail server 11 still further comprises a database portion 20 so that data are exchanged between the database portion 20 and each of the received e-mail filtering means 13 and the transmission e-mail filtering means 18. The database portion 20 is constituted with a memory area in a memory means so as to contain a plurality of databases, each of which is represented with a label including "DB", as occasion demands, in the drawings of the present application.

The database portion 20 contains, for example, a mate's e-mail address database on which a group of e-mail addresses given to each communication mate are registered, a black list database on which a group of specific e-mail addresses, with each of which e-mail communication is to be refused, are registered, a variable open e-mail address database on which a variable open e-mail address corresponding to the group of e-mail addresses given to each communication mate is registered, a communication mate validation e-mail address database on which an e-mail address for communication mate validation is registered, a delivery refusal history database on which the group of e-mail addresses given to each communication mate are registered in relation to the number of times of delivery refusals and the time of the final delivery refusal with every account, a validation e-mail reception record database on which an addressee's e-mail address or information corresponding to the addressee's e-mail address, the time of reception and an identification number of an e-mail which has the addressee's e-mail address identical with the e-mail address for communication mate validation or an e-mail address for validation in the time renewal system are registered, a peculiar open e-mail address database on which a peculiar open e-mail address is registered, and a time renewal validation e-mail address database on which the e-mail address for validation in the time renewal system is registered. The e-mail address is represented with a label including"MA", as occasion demands, in the drawings of the present application.

The e-mail server 11 thus constituted is operative to provide the account of each member with one or more of the peculiar open e-mail address, the variable open e-mail address, the e-mail address for communication mate validation and the e-mail address for validation in the time renewal system, which are selected on demand, and further operative to transfer the e-mail to the member's terminal apparatus and receive the e-mail from the member transmitted by the member's terminal apparatus.

The e-mail received by the e-mail receiving means 12 is subjected to the judgment passed by the received e-mail filtering means 13. In the case where the judgment at the received e-mail filtering means 13 permits the e-mail to be delivered, the e-mail received by the e-mail receiving means 12 is delivered by the e-mail delivering means 14 to one of the mailboxes corresponding respectively to the accounts in the mailbox portion 15 and then transferred by the e-mail transferring means 16 from the mailbox in the mailbox portion 15 to the member's terminal apparatus which corresponds to the addressee's e-mail address of the e-mail received by the e-mail receiving means 12. On the other hand, in the case where the judgment at the received e-mail filtering means 13 does not permit the e-mail to be delivered, the e-mail received by the e-mail receiving means 12 is destroyed or refused to be delivered at the received e-mail filtering means 13. When the e-mail received by the e-mail receiving means 12 is refused to be delivered, a delivery refusal notice e-mail is transmitted from the received e-mail filtering means 13 to the transmission e-mail filtering means 18.

The e-mail from the member received by the member's e-mail receiving means 17 is subjected to a judgment for deciding whether the e-mail from the member is to be not transmitted or not by the transmission e-mail filtering means 18. In the case where the judgment by the transmission e-mail filtering means 18 results is the decision that the e-mail is to be not transmitted, the e-mail from the member is not delivered to the e-mail transmitting means 19 and a non-transmission notice e-mail is transmitted non-transmission notice e-mail to the e-mail delivering means 14. In the e-mail delivering means 14, the non-transmission notice e-mail from the transmission e-mail filtering means 18 is dealt with in the same manner as the e-mail having been subjected to the judgment by the received e-mail filtering means 13 so as to be transferred by the e-mail transferring means 16 to the member's terminal apparatus. On the other hand, in the case where the judgment by the transmission e-mail filtering means 18 results is the decision that the e-mail is to be transmitted, the e-mail from the member is subjected further to the processing by the transmission e-mail filtering means 18 as the transmission e-mail. The e-mail from the member having been subjected to the processing by the transmission e-mail filtering means 18 is delivered to the e-mail transmitting means 19 and then transmitted by the e-mail transmitting means 19. Further, in the transmission e-mail filtering means 18, the delivery refusal notice e-mail from the received e-mail filtering means 13 is dealt with in the same manner as the e-mail from the member on which the decision that the e-mail is to be transmitted has been made so as to be subjected to the processing and then delivered to the e-mail transmitting means 19. The e-mail transmitting means 19 transmits the delivery refusal notice e-mail having been subjected to the processing by the transmission e-mail filtering means 18.

Figure 2:
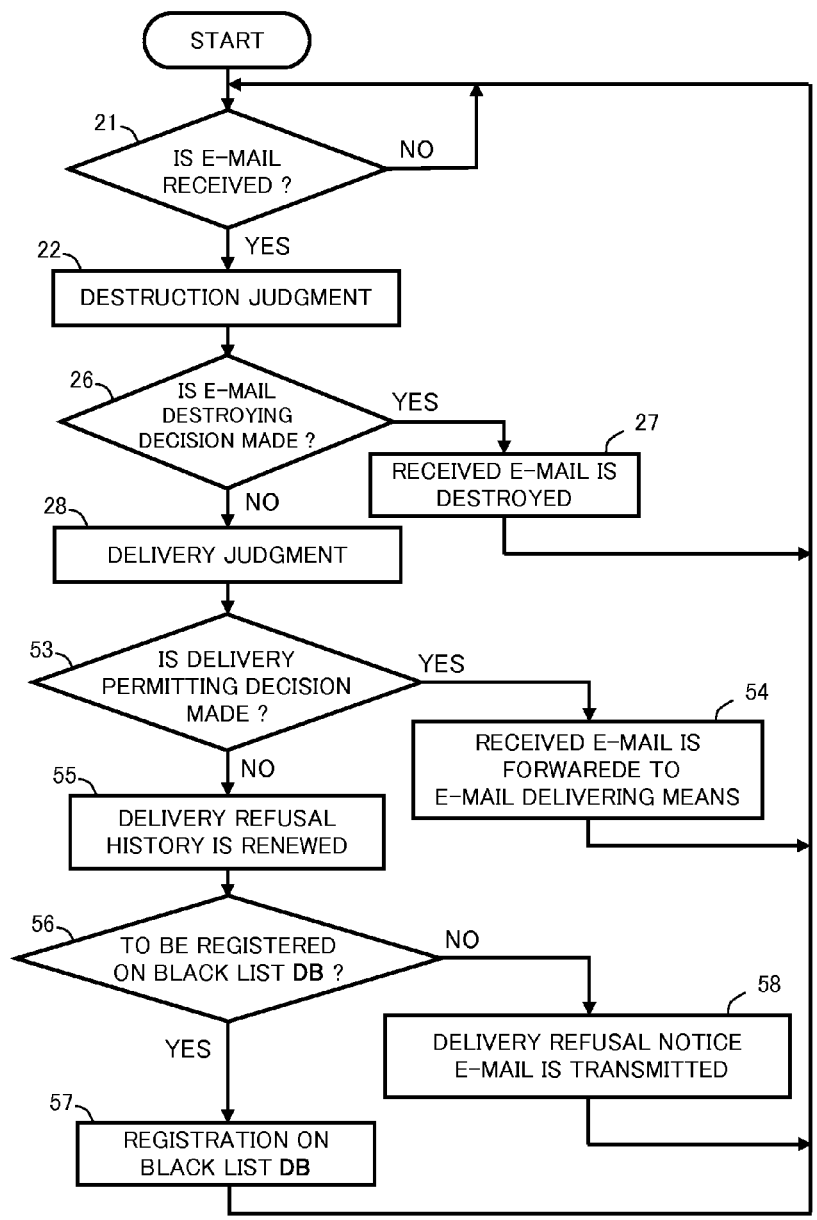
FIG. 2 is a flow chart used for explaining a judgment proceeding performed on received e-mails by received e-mail filtering means in the embodiment shown in FIG. 1.

The judgment passed on the e-mail received by the e-mail receiving means 12 by the received e-mail filtering means 13 is carried out with communications between the received e-mail filtering means 13 and the databases contained in the database portion 20 in accordance with, for example, sequential steps in a flow chart shown in FIG. 2.

Referring to the flow chart shown in FIG. 2, after a start, it is checked whether the e-mail is received by the e-mail receiving means 12 or not, at step 21. If not, the check at the step 21 is repeated until the e-mail is received by the e-mail receiving means 12. When the e-mail has been received by the e-mail receiving means 12, the process advances to step 22.

At the step 22, a destruction judgment is formed on the e-mail received by the e-mail receiving means 12, namely, the received e-mail. In the destruction judgment, for example, in the case where the addressee's e-mail address of the received e-mail is the e-mail address for communication mate validation, an e-mail destroying decision is made on the receive e-mail by the received e-mail filtering means 13 for causing the received e-mail to be destroyed when it has passed a predetermined time after provision of the e-mail address for communication mate validation, and in the case where the addressee's e-mail address of the received e-mail is the e-mail address for validation in the time renewal system, an e-mail destroying decision is made on the receive e-mail by the received e-mail filtering means 13 for causing the received e-mail to be destroyed. Further, the destruction judgment is also formed on the received e-mail by the received e-mail filtering means 13 in accordance with, for example, sequential steps in a flow chart shown in FIG. 3.

Figure 3:
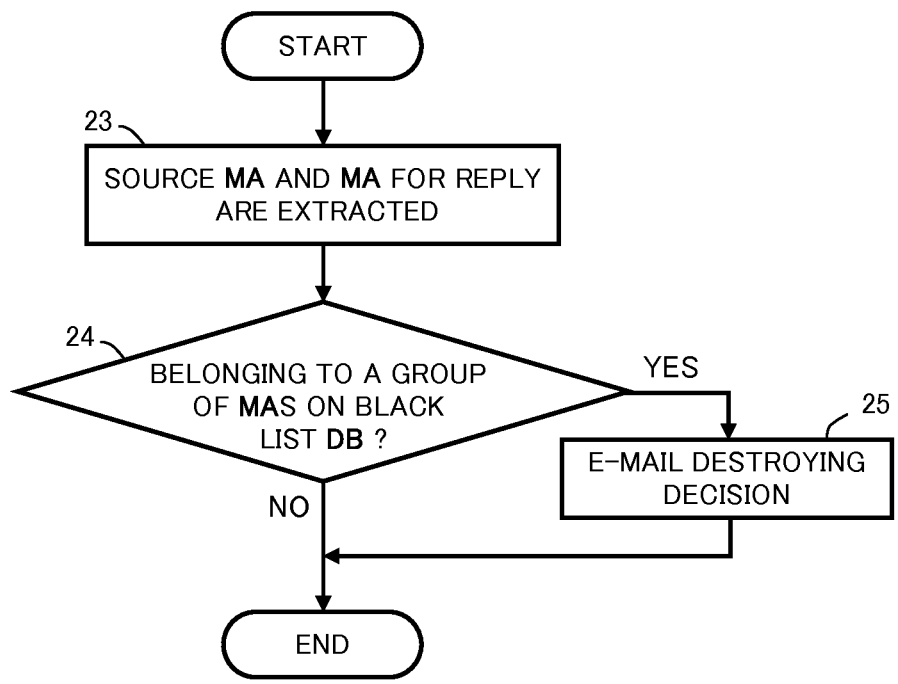
FIG. 3 is a flow chart used for explaining a destruction judgment formed by the received e-mail filtering means in the embodiment shown in FIG. 1.

Referring to the flow chart shown in FIG. 3, after a start, a source e-mail address and an e-mail address for reply of the received e-mail are extracted, at step 23. Then, at step 24, it is checked whether each of the source e-mail address and the e-mail address for reply extracted from the received e-mail belongs to e-mail addresses registered on the black list database contained in the database portion 20 or not.

If it is clarified that each of the source e-mail address and the e-mail address for reply extracted from the received e-mail does not belong to the e-mail addresses registered on the black list database as a result of the check at the step 24, the destruction judgment on the received e-mail is finished at the step 24. On the other hand, if it is clarified that at least one of the source e-mail address and the e-mail address for reply extracted from the received e-mail belongs to the e-mail addresses registered on the black list database as a result of the check at the step 24, an e-mail destroying decision is made for causing the received e-mail to be destroyed and the destruction judgment on the received e-mail is finished at step 25.

Next, at step 26 in the flow chart shown in FIG. 2, it is checked whether the e-mail destroying decision is made by the destruction judgment or not. If it is clarified that the e-mail destroying decision is made as a result of the check at the step 26, the received e-mail is destroyed at step 27 and the process returns to the step 21. On the other hand, if it is clarified that the e-mail destroying decision is not made as a result of the check at the step 26, the process advances to step 28.

Figure 4:
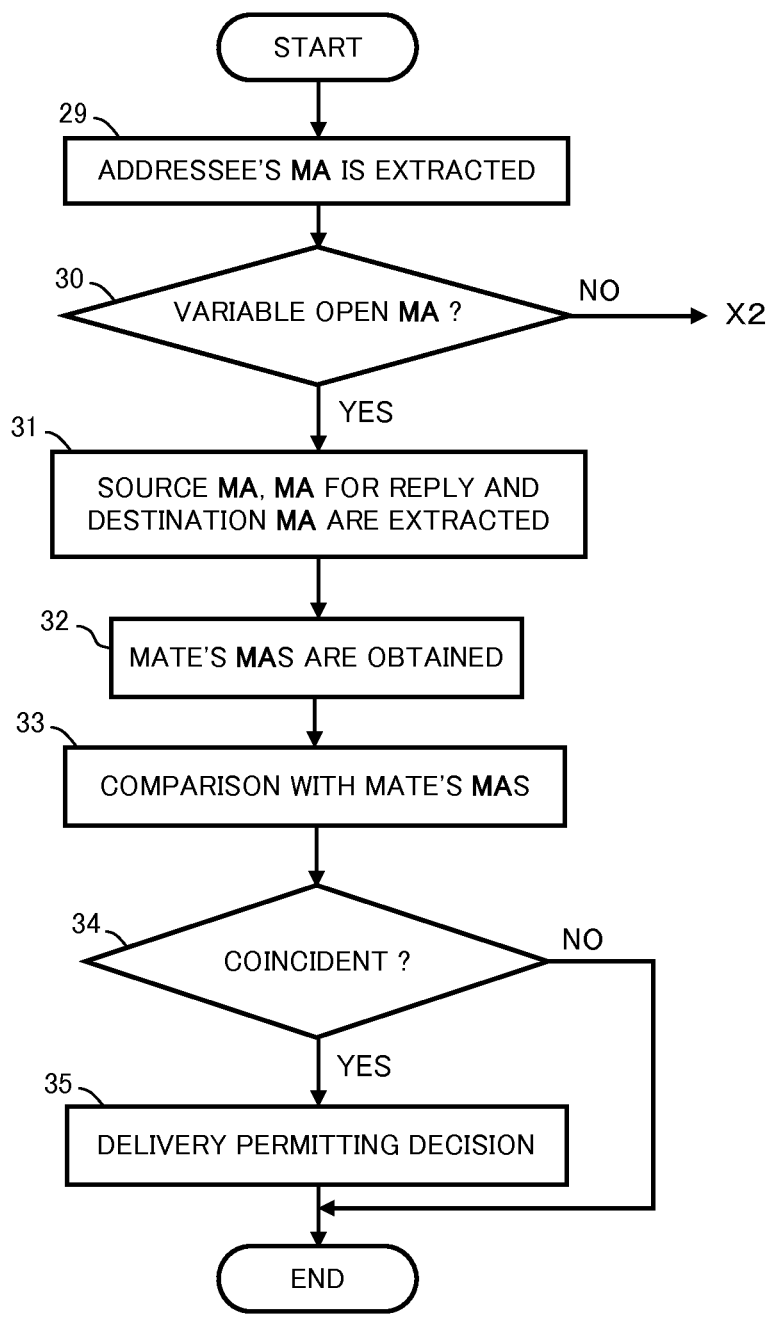
FIG. 4 is a flow chart used for explaining a delivery judgment formed by the received e-mail filtering means in the embodiment shown in FIG. 1.
Figure 5:
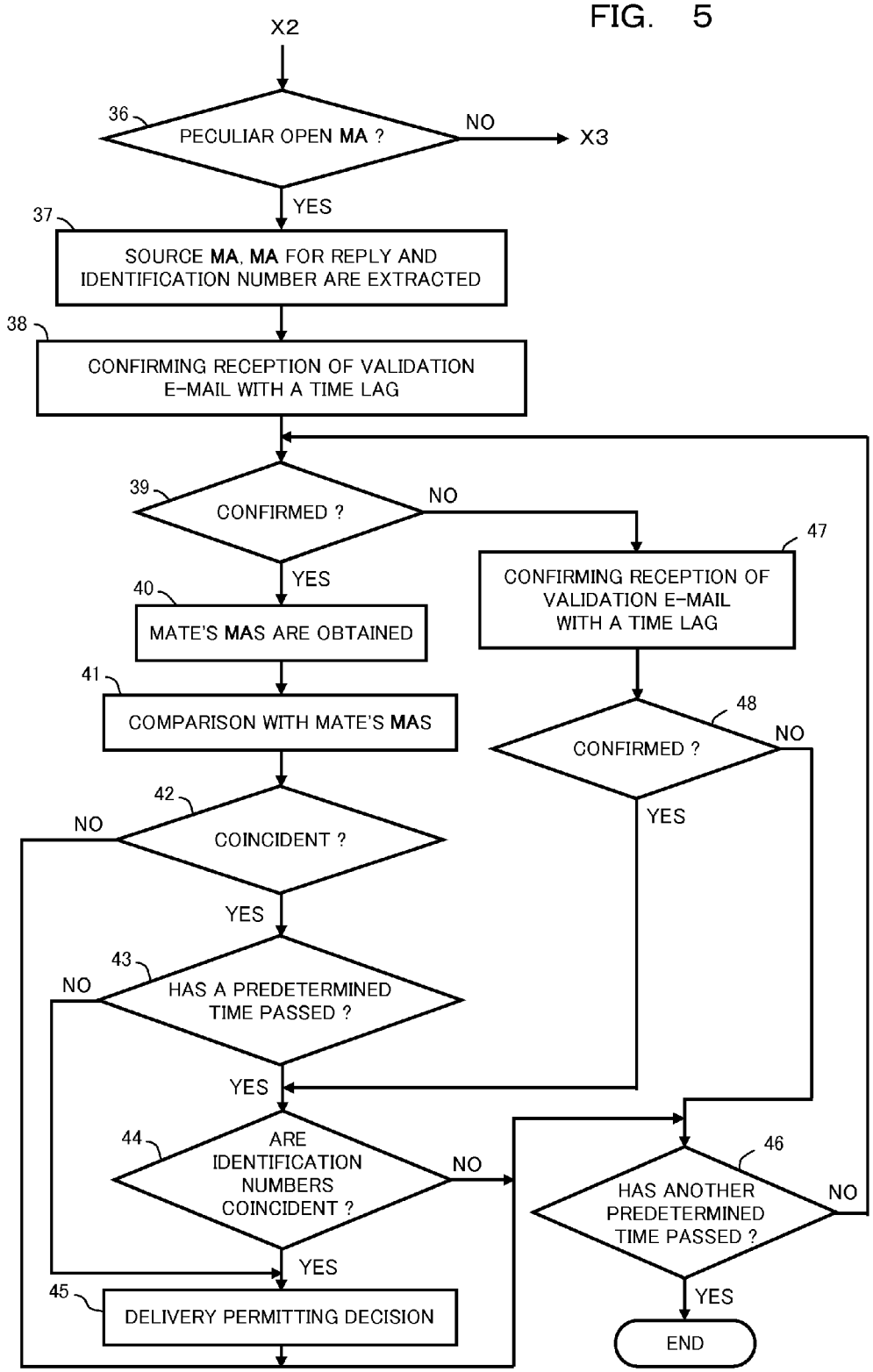
FIG. 5 is a flow chart used for explaining the delivery judgment formed by the received e-mail filtering means in the embodiment shown in FIG. 1.
Figure 6:
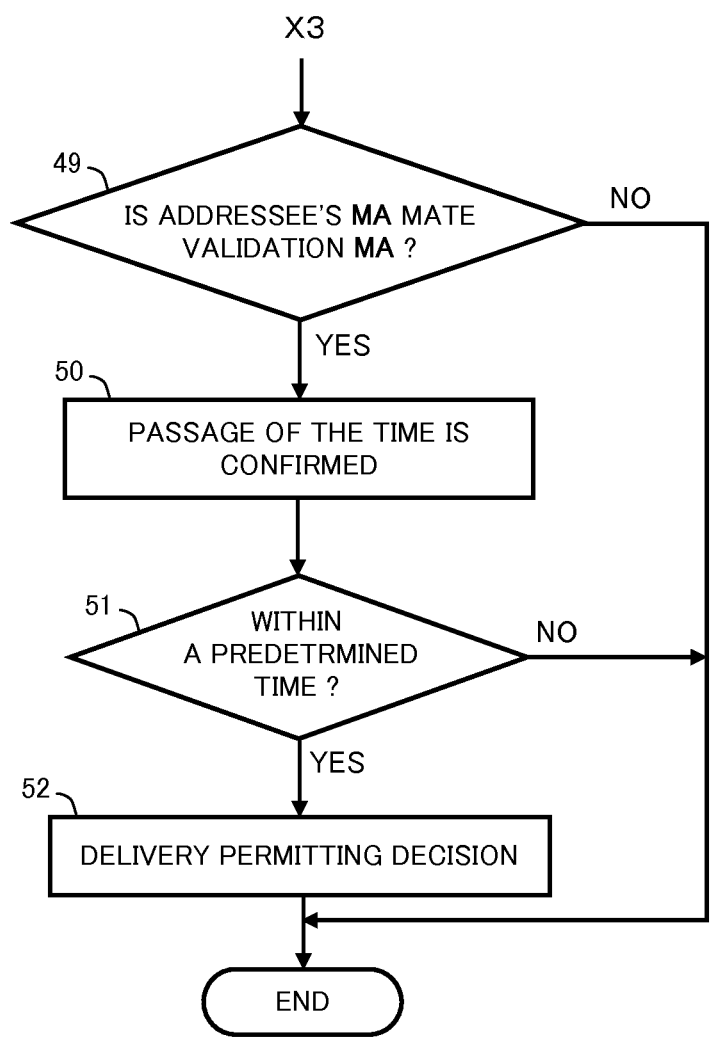
FIG. 6 is a flow chart used for explaining the delivery judgment formed by the received e-mail filtering means in the embodiment shown in FIG. 1.

At the step 28, a delivery judgment is formed on the received e-mail in accordance with, for example, sequential steps in a plurality of flow charts shown in FIGS. 4 to 6.

Referring to the flow chart shown in FIG. 4, after a start, an addressee's e-mail address of the received e-mail is extracted at step 29. Then, at step 30, it is checked whether the addressee's e-mail address extracted from the received e-mail is a variable open e-mail address or not. If it is clarified that the addressee's e-mail address extracted from the received e-mail is the variable open e-mail address as a result of the check at the step 30, the source e-mail address, the e-mail address for reply and a destination e-mail address of the received e-mail are extracted at step 31 and the e-mail addresses given to the communication mate corresponding to the addressee's e-mail address of the received e-mail are obtained at step 32.

After that, at step 33, each of the source e-mail address, the e-mail address for reply and the destination e-mail address extracted at the step 31 is compared with the e-mail addresses given to the communication mate which are obtained at the step 32. Then, at step 34, it is checked whether any of the e-mail addresses obtained at the step 32 is coincident with one of the source e-mail address, the e-mail address for reply and the destination e-mail address extracted at the step 31 or not.

If it is clarified that none of the e-mail addresses obtained at the step 32 is coincident with one of the source e-mail address as a result of the check at the step 34, the delivery judgment on the received e-mail is finished at the step 34. On the other hand, if it is clarified that one of the e-mail addresses obtained at the step 32 is coincident with one of the source e-mail address as a result of the check at the step 34, a delivery permitting decision is made for causing the received e-mail to be delivered and the delivery judgment on the received e-mail is finished at step 35.

If it is clarified that the addressee's e-mail address extracted from the received e-mail is not the variable open e-mail address as a result of the check at the step 30, the process advances to step 36 (FIG. 5). At the step 36, it is checked whether the addressee's e-mail address extracted from the received e-mail is a peculiar open e-mail address on not. If it is clarified that the addressee's e-mail address extracted from the received e-mail is the peculiar open e-mail address as a result of the check at the step 36, the source e-mail address and the e-mail address for reply of the received e-mail and an identification number attached to the received e-mail for identifying the same are extracted at step 37.

Next, at step 38, it is confirmed by the e-mail receiving means 12 that an e-mail for validation (hereinafter, referred to as a validation e-mail) which has its addressee's e-mail address identical with an e-mail address for communication mate validation has been received with a predetermined time lag from the received e-mail. Then, at step 39, it is checked whether the reception of the validation e-mail with the predetermined time lag from the received e-mail has been confirmed at the step 38 or not. If it is clarified that the reception of the validation e-mail with the predetermined time lag from the received e-mail has been confirmed at the step 38 as a result of the check at the step 39, e-mail addresses given to a communication mate corresponding to the e-mail address for communication mate validation of the validation e-mail are obtained at step 40.

After that, at step 41, the source e-mail address and the e-mail address for reply extracted from the received e-mail at the step 37 are compared with the e-mail addresses given to the communication mate which are obtained at the step 40. Then, at step 42, it is checked whether any of the e-mail addresses obtained at the step 40 is coincident with any of the source e-mail address and the e-mail address for reply extracted from the received e-mail at the step 37 or not.

If it is clarified that one of the e-mail addresses obtained at the step 40 is coincident with one of the source e-mail address and the e-mail address for reply extracted at the step 37 as a result of the check at the step 42, it is checked whether it has passed a predetermined time after the e-mail address for communication mate validation of the validation e-mail is provided or not at step 43. When the predetermined time has passed after the e-mail address for communication mate validation of the validation e-mail is provided, it is further checked that the identification number of the received e-mail extracted at the step 37 is coincident with the identification number of the validation e-mail or not, at step 44.

If it is clarified that the identification number of the received e-mail is coincident with the identification number of the validation e-mail as a result of the check at the step 44, the delivery permitting decision is made for causing the received e-mail to be delivered at step 45 and the process advances to step 46. On the other hand, if it is clarified that the identification number of the received e-mail is not coincident with the identification number of the validation e-mail as the result of the check at the step 44, the process advances directly to the step 46 from the step 44.

In the case where it is clarified that the predetermined time has not passed after the e-mail address for communication mate validation of the validation e-mail is provided as a result of the check at the step 43, the process advances directly to the step 45 from the step 43. In addition, it is clarified that none of the e-mail addresses obtained at the step 40 is coincident with one of the source e-mail address and the e-mail address for reply extracted at the step 37 as the result of the check at the step 42, the process advances directly to the step 46 from the step 42.

Further, in the case where it is clarified that the reception of the validation e-mail with the predetermined time lag from the received e-mail has not been confirmed at the step 38 as a result of the check at the step 39, it is confirmed by the e-mail receiving means 12 that a validation e-mail which has its addressee's e-mail address identical with an e-mail address for validation in the time renewal system has been received with a predetermined time lag from the received e-mail at step 47. Then, at step 48, it is checked whether the reception of the validation e-mail with the predetermined time lag from the received e-mail has been confirmed at the step 47 or not. If it is clarified that the reception of the validation e-mail with the predetermined time lag from the received e-mail has been confirmed at the step 47 as a result of the check at the step 48, the process advances from the step 48 to the step 44. On the other hand, if it is clarified that the reception of the validation e-mail with the predetermined time lag from the received e-mail has not been confirmed at the step 47 as the result of the check at the step 48, the process advances from the step 48 to the step 46.

At the step 46, it is checked that it has passed another predetermined time longer than the predetermined time lag after the e-mail has been received by the e-mail receiving means 12 or not. If not, the process returns to the step 39. On the other hand, if the predetermined time longer than the predetermined time lag has passed, the delivery judgment on the received e-mail is finished at the step 46.

When it is clarified that the addressee's e-mail address extracted from the received e-mail is not the peculiar open e-mail address as the result of the check at the step 36, the process advances to step 49 (FIG. 6). At the step 49, it is checked that the addressee's e-mail address extracted from the received e-mail is an e-mail address for communication mate validation or not. If it is clarified that the addressee's e-mail address extracted from the received e-mail is the e-mail address for communication mate validation as a result of the check at the step 49, the time which has passed after the e-mail address for communication mate validation of the received e-mail is provided is confirmed at step 50. Then, at step 51, it is checked whether the confirmed time is not longer than a predetermined time or not. If the confirmed time is longer than the predetermined time, the delivery judgment on the received e-mail is finished at the step 51. On the other hand, if the confirmed time is not longer than the predetermined time, the delivery permitting decision is made for causing the received e-mail to be delivered and the delivery judgment on the received e-mail is finished at step 52.

Further, if it is clarified that that the addressee's e-mail address extracted from the received e-mail is not the e-mail address for communication mate validation as the result of the check at the step 49, the delivery judgment on the received e-mail is finished immediately at the step 49.

After the delivery judgment carried out at the step 28 in the flow chart shown in FIG. 2, it is checked whether the delivery permitting decision is made for causing the received e-mail to be delivered by the delivery judgment or not, at step 53. If it is clarified that the delivery permitting decision is made by the delivery judgment as a result of the check at the step 53, the received e-mail is forwarded to the e-mail delivering means 14, at step 54, and the process returns to the step 21.

On the other hand, If it is clarified that the delivery permitting decision is not made by the delivery judgment as the result of the check at the step 53, a delivery refusal history on the delivery refusal history database contained in the database portion 20 is renewed at step 55 and then it is checked whether each of the source e-mail address and the e-mail address for reply of the received e-mail is to be registered on the black list database contained in the database portion 20 or not, at step 56. If it is clarified that each of the source e-mail address and the e-mail address for reply of the received e-mail is to be registered on the black list database as a result of the check at the step 56, the source e-mail address and the e-mail address for reply of the received e-mail are registered on the black list database, at step 57, and the process returns to the step 21. If it is clarified that each of the source e-mail address and the e-mail address for reply of the received e-mail is to be not registered on the black list database as a result of the check at the step 56, the delivery refusal notice e-mail is transmitted from the received e-mail filtering means 13 to the transmission e-mail filtering means 18, at step 58, and the process returns to the step 21.

The received e-mail filtering means 13, which is operative to pass the judgment on the received e-mail in the manner as described above, is operative further to carry out renewals of the databases contained in the database portion 20. Such renewals carried out by the received e-mail filtering means 13 include, for example, renewals of the mate's e-mail address database, the delivery refusal history database and the black list database each conducted on the occasion of reception of the e-mail.

Figure 7:
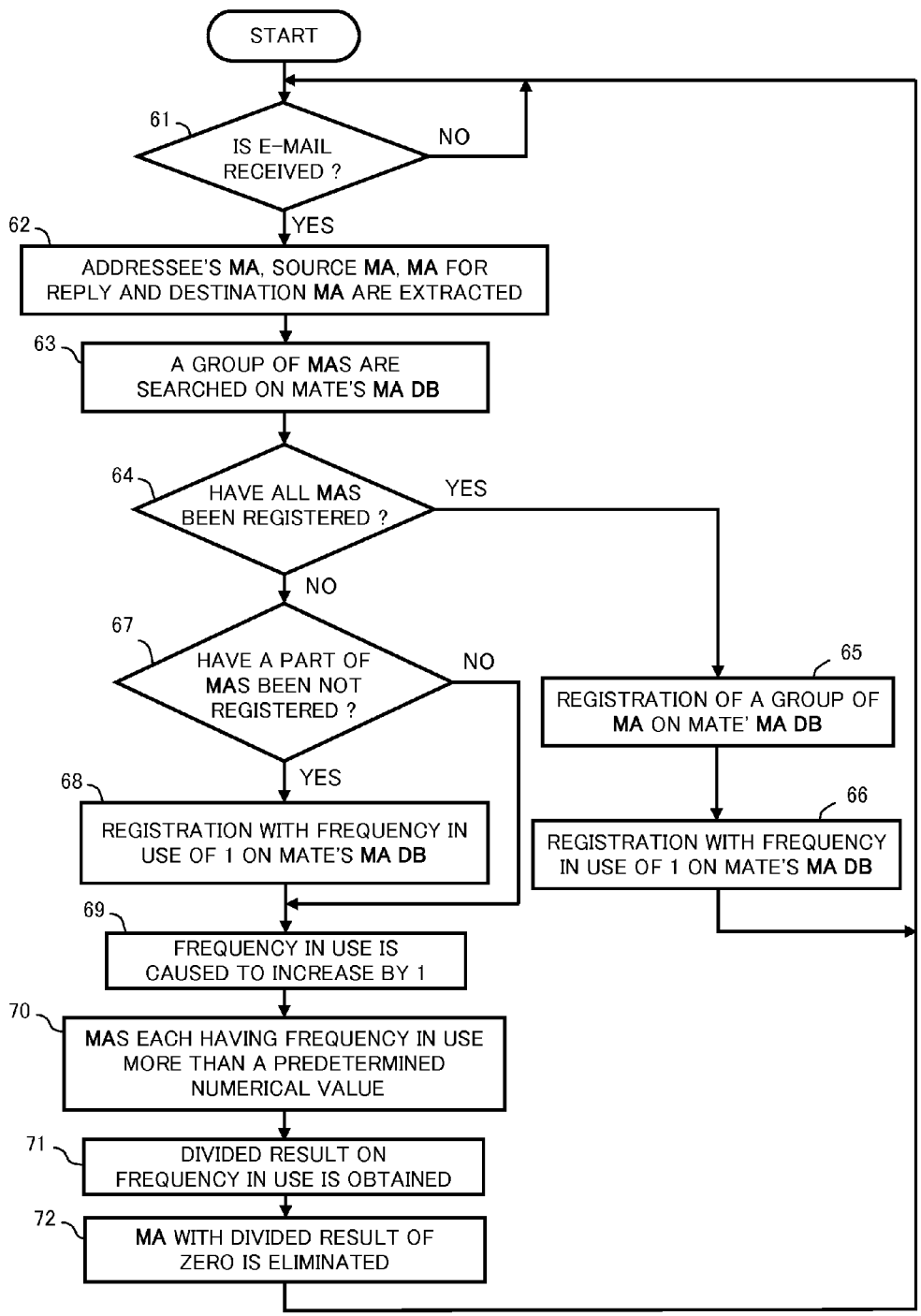
FIG. 7 is a flow chart used for explaining a database renewal proceeding performed on a mate's e-mail address database by the received e-mail filtering means in the embodiment shown in FIG. 1 on the occasion of reception of an e-mail.

When the e-mail is received by the e-mail receiving means 12, the received e-mail filtering means 13 carries out the renewal of the mate's e-mail address database contained in the database portion 20 in accordance with, for example, sequential steps in a flow chart shown in FIG. 7.

Referring to the flow chart shown in FIG. 7, after a start, it is checked whether the e-mail is received by the e-mail receiving means 12 or not, at step 61. If not, the check at the step 61 is repeated until the e-mail is received by the e-mail receiving means 12.

When it is clarified that the e-mail has been received by the e-mail receiving means 12 as a result of the check at the step 61, the addressee's e-mail address, the source e-mail address, the e-mail address for reply and the destination e-mail address are extracted from the received e-mail, at step 62. Next, at step 63, a group of e-mail addresses to which each of the source e-mail address and the e-mail address for reply extracted at the step 62 belongs are searched on the mate's e-mail address database contained in the database portion 20. Then, at step 64, it is checked whether all of the source e-mail addresses and the e-mail addresses for reply, each of which is not coincident with each of the addressee's e-mail address and the destination e-mail address extracted at the step 62, have not been registered on the mate's e-mail address database contained in the database portion 20 or not.

If it is clarified that all of the source e-mail addresses and the e-mail addresses for reply, each of which is not coincident with each of the addressee's e-mail address and the destination e-mail address extracted at the step 62, have not been registered on the mate's e-mail address database as a result of the check at the step 64, a group of e-mail address is newly registered on the mate's e-mail address database, at step 65, so that each of the source e-mail addresses and the e-mail addresses for reply, which is not coincident with each of the addressee's e-mail address and the destination e-mail address extracted at the step 62, is registered with the frequency in use of "1" on the mate's e-mail address database so as to belong to the group of e-mail address newly registered on the same, at step 66, and the process returns to the step 61.

If it is clarified that a part or all of the source e-mail addresses and the e-mail addresses for reply, each of which is not coincident with each of the addressee's e-mail address and the destination e-mail address extracted at the step 62, have been registered on the mate's e-mail address database as a result of the check at the step 64, it is checked whether the part of the source e-mail addresses and the e-mail addresses for reply, each of which is not coincident with each of the addressee's e-mail address and the destination e-mail address extracted at the step 62, have been registered on the mate's e-mail address database or not, at step 67.

If it is clarified that the part of the source e-mail addresses and the e-mail addresses for reply, each of which is not coincident with each of the addressee's e-mail address and the destination e-mail address extracted at the step 62, have not been registered on the mate's e-mail address database as a result of the check at the step 67, the part of the source e-mail addresses and the e-mail addresses for reply, which is not coincident with each of the addressee's e-mail address and the destination e-mail address extracted at the step 62, is registered with the frequency of use of "1" on the mate's e-mail address database so as to belong to the group of e-mail address to which another part of the source e-mail addresses and the e-mail addresses for reply, each of which is not coincident with each of the addressee's e-mail address and the destination e-mail address extracted at the step 62 and has been registered on the mate's e-mail address database, have belonged, at step 68, and the process advances to step 69. On the other hand, If it is clarified that all of the source e-mail addresses and the e-mail addresses for reply, each of which is not coincident with each of the addressee's e-mail address and the destination e-mail address extracted at the step 62, have been registered on the mate's e-mail address database as the result of the check at the step 67, the process advances directly to the step 69 from the step 67.

At the step 69, the frequency in use for each of the source e-mail addresses and the e-mail addresses for reply, which is not coincident with each of the addressee's e-mail address and the destination e-mail address and has been registered on the mate's e-mail address database, is caused to increase by "1". Then, at step 70, e-mail addresses registered on the mate's e-mail address database, each of which has the frequency in use of a numerical value more than a predetermined numerical value, are searched on the mate's e-mail address database, and at step 71, the frequency in use for each of the e-mail addresses, which belongs to the group of e-mail addresses to which the mail addresses searched at the step 70 belong, is subjected to a division with a predetermined divisor so that a divided result which includes a quotient and from which a residual is omitted is obtained.

Next, at step 72, an e-mail address on which the divided result obtained at the step 71 is zero is eliminated from the mate's e-mail address database. After that, the process returns to the step 21.

As described above, the renewal of the mate's e-mail address database contained in the database portion 20 is continuously carried out by the received e-mail filtering means 13.

Figure 8:
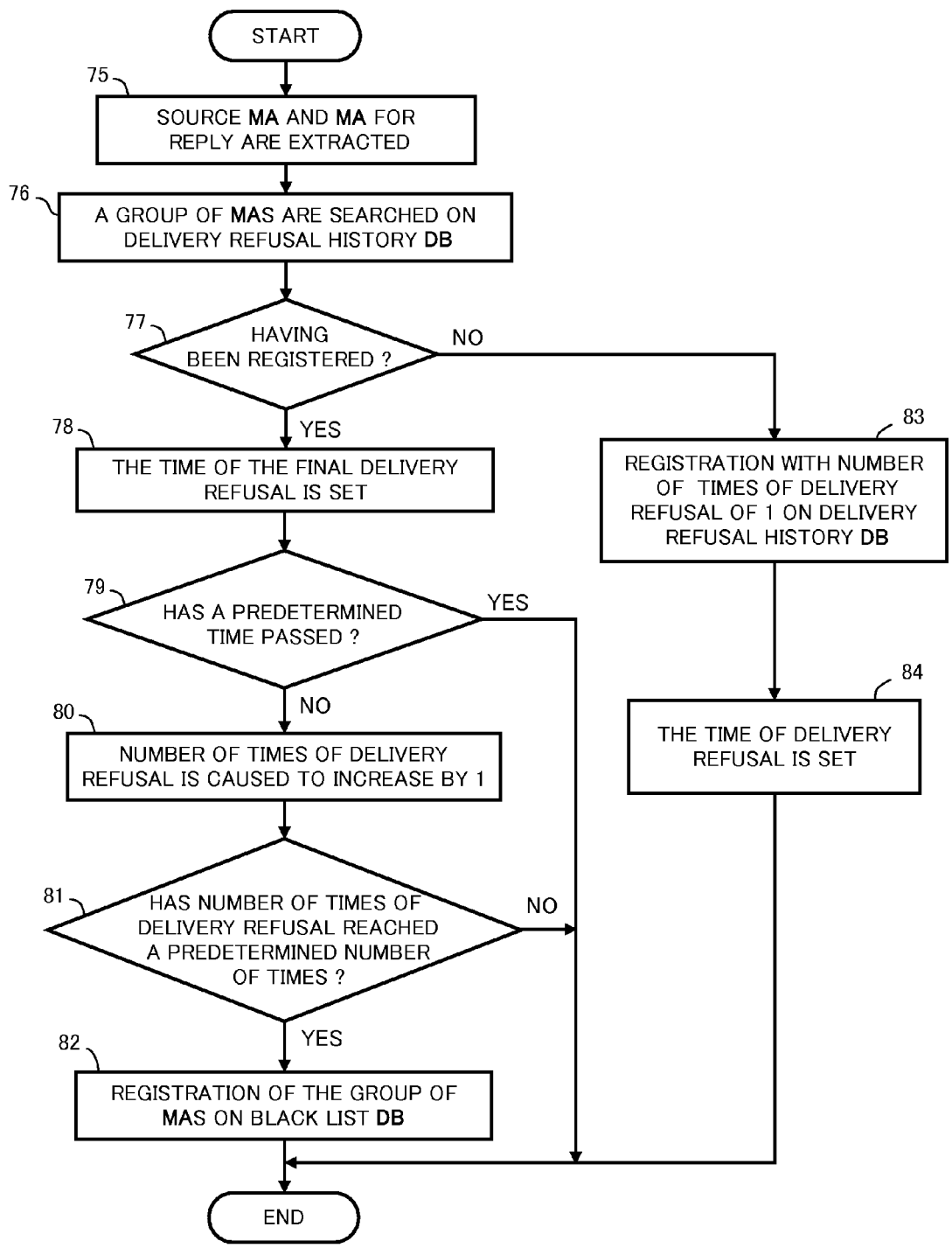
FIG. 8 is a flow chart used for explaining a database renewal proceeding performed on a delivery refusal history database and a black list database by the received e-mail filtering means in the embodiment shown in FIG. 1.

The received e-mail filtering means 13 further carries out the renewal of each of the delivery refusal history database and the black list database contained in the database portion 20 in accordance with, for example, sequential steps in a flow chart shown in FIG. 8.

Referring to the flow chart shown in FIG. 8, after a start, the source e-mail address and the e-mail address for reply are extracted from the received e-mail which is refused to be delivered, at step 75. Next, at step 76, a group of e-mail addresses to which each of the source e-mail address and the e-mail address for reply extracted at the step 62 belongs are searched on the delivery refusal history database contained in the database portion 20. Then, at step 77, it is checked whether the group of e-mail addresses, to which each of the source e-mail addresses and the e-mail addresses for reply extracted at the step 75 belongs, have been registered on the delivery refusal history database or not.

When it is clarified that the group of e-mail addresses, to which each of the source e-mail addresses and the e-mail addresses for reply extracted at the step 75 belongs, have been registered on the delivery refusal history database as a result of the check at the step 77, the time on that occasion is newly set to be the time of the final delivery refusal for the group of e-mail addresses to which each of the source e-mail addresses and the e-mail addresses for reply extracted at the step 75 belongs, at step 78. Then, at step 79, it is checked whether it has passed a predetermined time after the time of the final delivery refusal having been previously set.

If it is clarified that the predetermined time has not passed after the time of the final delivery refusal having been previously set as a result of the check at the step 79, the number of times of delivery refusals for the group of e-mail addresses to which each of the source e-mail addresses and the e-mail addresses for reply extracted at the step 75 belongs on the delivery refusal history database is caused to increase by "1", at step 80. Then, at step 81, it is checked whether the number of times of delivery refusals caused to increase by "1" at the step 80 has reached a predetermined number of times or not. If the number of times of delivery refusals has reached the predetermined number of times, the group of e-mail addresses to which each of the source e-mail addresses and the e-mail addresses for reply extracted at the step 75 belongs are registered on the black list database contained in the database portion 20 and the process is finished, at step 82. On the contrary, if the number of times of delivery refusals has not reached the predetermined number of times, the process is finished at step 81.

If it is clarified that the predetermined time has passed after the time of the final delivery refusal having been previously set as the result of the check at the step 79, the process is finished at step 79.

In the case where it is clarified that the group of e-mail addresses, to which each of the source e-mail addresses and the e-mail addresses for reply extracted at the step 75 belongs, have not been registered on the delivery refusal history database as the result of the check at the step 77, the group of e-mail addresses to which each of the source e-mail addresses and the e-mail addresses for reply extracted at the step 75 belongs are registered with the number of times of delivery refusals of "1" on the delivery refusal history database, at step 83. Then, at step 84, the time on that occasion is set to be the time of the final delivery refusal for the group of e-mail addresses newly registered on the delivery refusal history database at step 83 and the process is finished.

With the process described above, the renewal of each of the delivery refusal history database and the black list database contained in the database portion 20 by the received e-mail filtering means 13 is completed.

Figure 9:
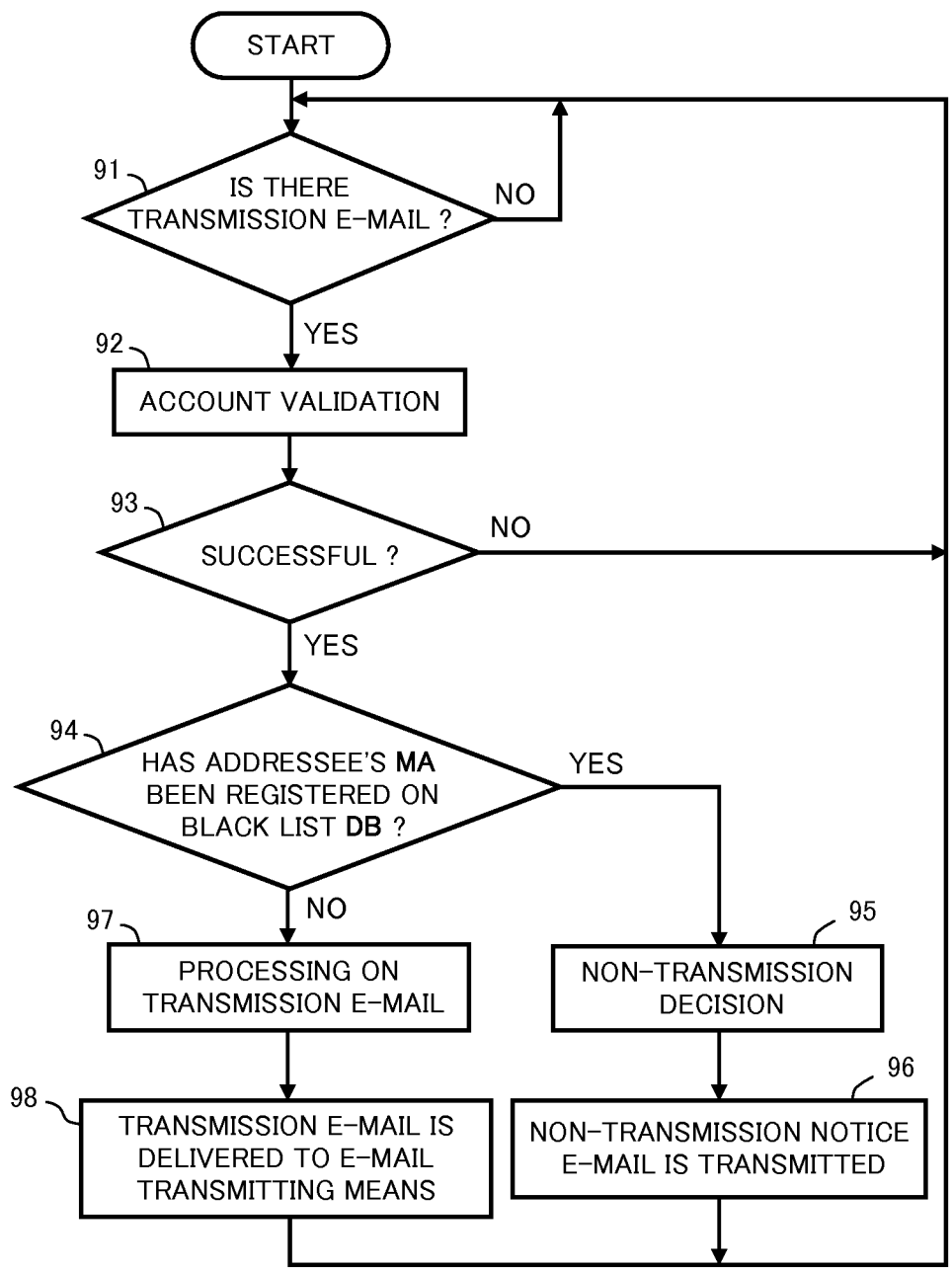
FIG. 9 is a flow chart used for explaining various kinds of e-mail processing including the e-mail processing on a transmission e-mail performed by a transmission e-mail filtering means in the embodiment shown in FIG. 1.

The e-mail processing by the transmission e-mail filtering means 18, which includes the processing on the e-mail from the member received by the member's e-mail receiving means 17 as the transmission e-mail and the processing on the delivery refusal notice e-mail from the received e-mail filtering means 13 as the transmission e-mail, is carried out with communications between the transmission e-mail filtering means 18 and the databases contained in the database portion 20 in accordance with, for example, sequential steps in a flow chart shown in FIG. 9.

Referring to the flow chart shown in FIG. 9, after a start, it is checked whether there is the transmission e-mail which is the e-mail from the member received by the member's e-mail receiving means 17 or the delivery refusal notice e-mail from the received e-mail filtering means 13 or not, at step 91. If not, the check at the step 91 is repeated until the transmission e-mail is found. When the transmission e-mail is found, an account validation for validating the account of the member who is the source of the transmission e-mail is conducted, at step 92. Then, at step 93, it is checked whether the account validation has been finished successfully at the step 92 or not.

If it is clarified that the account validation has been finished unsuccessfully at the step 92 as a result of the check at the step 93, the process returns to the step 91. If it is clarified that the account validation has been finished successfully at the step 92 as the result of the check at the step 93, it is checked whether the addressee's e-mail address of the transmission e-mail has been registered on the black list database contained in the database portion 20 for the account corresponding to the source e-mail address of the transmission e-mail or not, at step 94. If the addressee's e-mail address of the transmission e-mail has been registered on the black list database, the decision that the e-mail is to be not transmitted is made on the transmission e-mail, at step 95, and the non-transmission notice e-mail is transmitted to the e-mail delivering means 14, at step 96. After that, the process returns to the step 91.

If it is clarified that the addressee's e-mail address of the transmission e-mail has not been registered on the black list database as a result of the check at the step 94, the transmission e-mail is subjected to processing for transmission at step 97 and the transmission e-mail having been subjected to the processing for transmission at the step 97 is delivered to the e-mail transmitting means 19 at step 98. After that, the process returns to the step 91. As a result, the transmission e-mail having been subjected to the processing for transmission is transmitted by the e-mail transmitting means 19.

Figure 10:
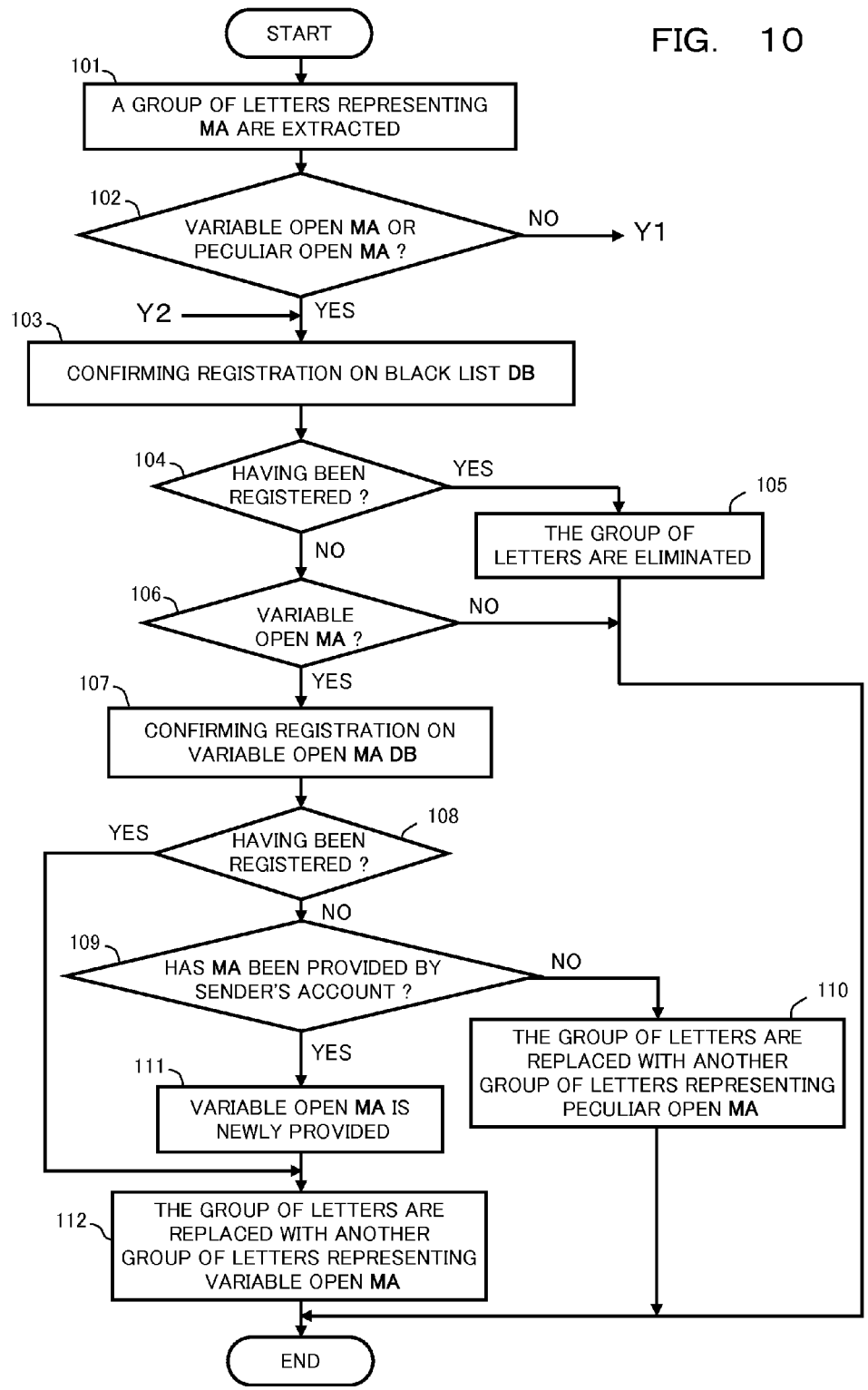
FIG. 10 is a flow chart used for explaining the e-mail processing on the transmission e-mail performed by the transmission e-mail filtering means in the embodiment shown in FIG. 1.

The processing for transmission to which the transmission e-mail is subjected at step 97 is carried out in accordance with, for example, sequential steps in a flow chart shown in FIG. 10.

Referring to the flow chart shown in FIG. 10, after a start, at step 101, a group of letters representing an e-mail address contained in the transmission e-mail, which has been provided to an account corresponding thereto, are extracted. Then, at step 102, it is checked whether the group of letters extracted at the step 101 represent one of a variable open e-mail address and a peculiar open e-mail address or not.

If it is clarified that the group of letters extracted at the step 101 represent the variable open e-mail address or the peculiar open e-mail address as a result of the check at the step 102, it is confirmed that at least one of e-mail addresses belonging to the group of e-mail addresses to which the addressee's e-mail address of the transmission e-mail belongs has been registered on the black list database contained in the database portion 20 for the account to which the e-mail address represented by the group of letters extracted at the step 101, at step 103. Then, at step 104, it is checked whether the confirmation at the step 103 results in the registration of at least one e-mail address on the black list database or not.

If it is clarified that the confirmation at the step 103 results in the registration of at lest one e-mail address on the black list database as a result of the check at the step 104, the group of letters extracted at the step 101 are eliminated and the processing for transmission is finished at step 105.

On the other hand, if it is clarified that the confirmation at the step 103 does not result in the registration of at least one e-mail address on the black list database as the result of the check at the step 104, it is checked whether the group of letters extracted at the step 101 represent the variable open e-mail address or not, at step 106. If not, since the group of letters extracted at the step 101 represent the peculiar open e-mail address, the processing for transmission is finished at the step 106.

If it is clarified that the group of letters extracted at the step 101 represent the variable open e-mail address as a result of the check at the step 106, it is confirmed that a variable open e-mail address corresponding to a group of e-mail addresses of a communication mate to which the addressee's e-mail address of the transmission e-mail belongs have been registered on the variable open e-mail address database contained in the database portion 20, at step 107. Then, at step 108, it is checked whether the confirmation at the step 107 results in the registration of the variable open e-mail address on the variable open e-mail address database or not.

If it is clarified that the confirmation at the step 107 does not result in the registration of the variable open e-mail address on the variable open e-mail address database as a result of the check at the step 108, it is checked whether the e-mail address represented by the group of letters extracted at the step 101 has been provided by an account corresponding to the sender's e-mail address of the transmission e-mail or not, at step 109. If not, the group of letters extracted at the step 101 are replaced with another group of letters representing a peculiar open e-mail address corresponding to an account by which the e-mail address represented by the group of letters extracted at the step 101 has been provided and the processing for transmission is finished at step 110.

On the other hand, if it is clarified that the e-mail address represented by the group of letters extracted at the step 101 has been provided by the account corresponding to the sender's e-mail address of the transmission e-mail as a result of the check at the step 109, the account corresponding to the sender's e-mail address of the transmission e-mail is newly provided with the variable open e-mail address corresponding to the group of e-mail addresses of the communication mate to which the addressee's e-mail address of the transmission e-mail belongs at step 111. Then, at step 112, the group of letters extracted at the step 101 are replaced with another group of letters representing the variable open e-mail address newly provided at the step 111 and the processing for transmission is finished.

If it is clarified that the confirmation at the step 107 results in the registration of the variable open e-mail address on the variable open e-mail address database as the result of the check at the step 108, the process advances directly to the step 112 from the step 108.

Figure 11:
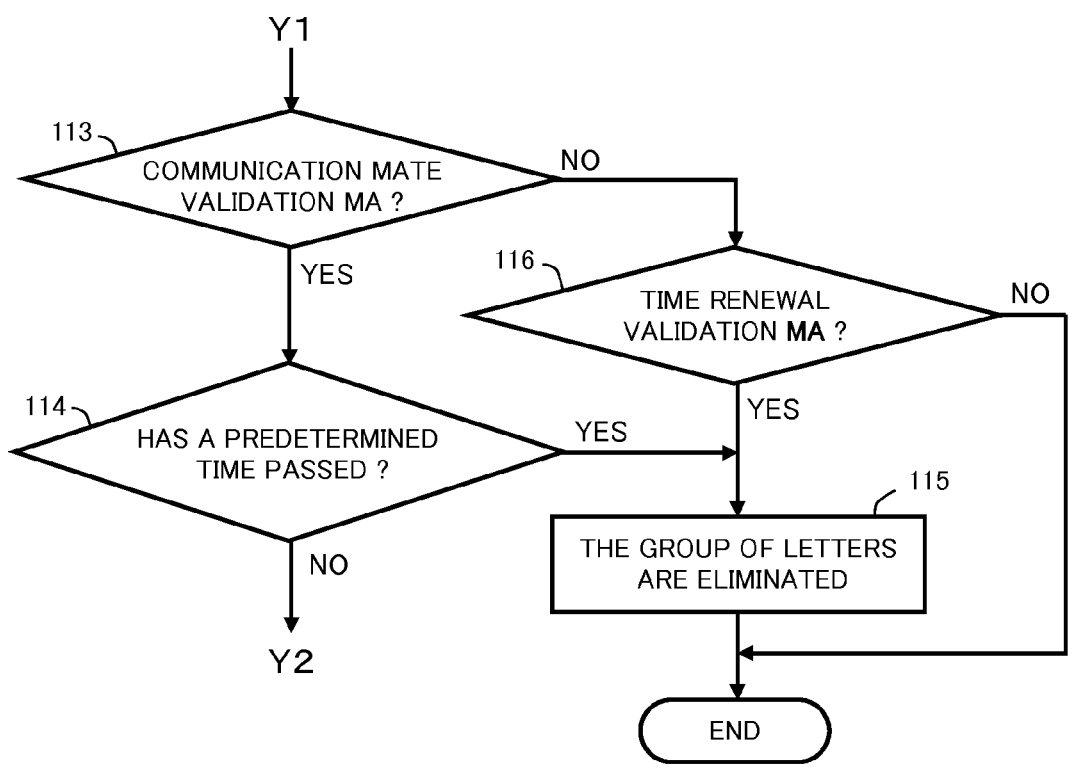
FIG. 11 is a flow chart used for explaining the e-mail processing on the transmission e-mail performed by the transmission e-mail filtering means in the embodiment shown in FIG. 1.

Further, if it is clarified that the group of letters extracted at the step 101 do not represent the variable open e-mail address or the peculiar open e-mail address as the result of the check at the step 102, it is checked whether the group of letters extracted at the step 101 represent an e-mail address for communication mate validation or not, at step 113 (FIG. 11). If the group of letters extracted at the step 101 represent the e-mail address for communication mate validation, it is checked whether it has passed a predetermined time after the e-mail address for communication mate validation represented by the group of letters extracted at the step 101 is provided or not, at step 114.

If it is clarified that the predetermined time has not passed after the e-mail address for communication mate validation represented by the group of letters extracted at the step 101 is provided as a result of the check at the step 114, the process advances to the step 103 (FIG. 10). If it is clarified that the predetermined time has passed after the e-mail address for communication mate validation represented by the group of letters extracted at the step 101 is provided as the result of the check at the step 114, the process advances to step 115.

If it is clarified that the group of letters extracted at the step 101 does not represent the e-mail address for communication mate validation as a result of the check at the step 113, it is checked whether the group of letters extracted at the step 101 represent an e-mail address for validation in the time renewal system or not, at step 116. If not, the processing for transmission is finished at the step 116. On the other hand, if the group of letters extracted at the step 101 represent the e-mail address for validation in the time renewal system, the process advances to step 115.

At the step 115, the group of letters extracted at the step 101 are eliminated and the processing for transmission is finished.

With the process described above, the e-mail processing including the processing on the transmission e-mail by the transmission e-mail filtering means 18 is completed.

The transmission e-mail filtering means 18, which is operative to perform the e-mail processing including the processing on the transmission e-mail in the manner as described above, is operative further to carry out renewal of the mate's e-mail address database contained in the database portion 20 conducted on the occasion of provision of the variable open e-mail address.

Figure 12:
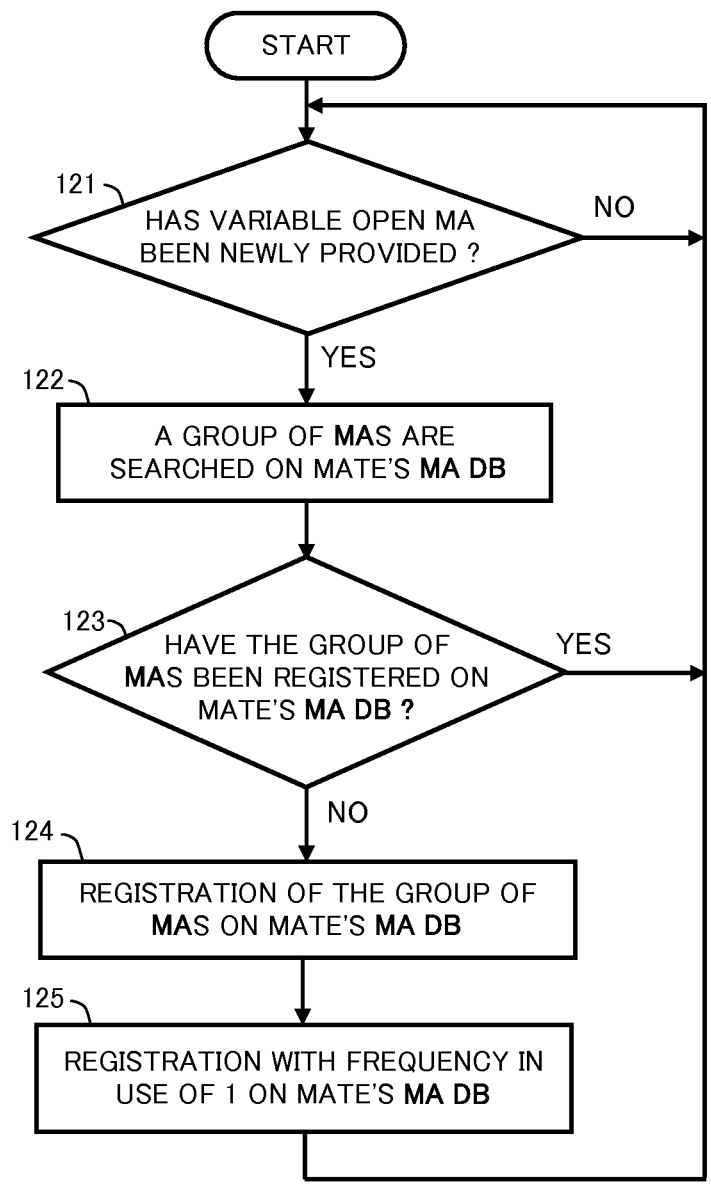
FIG. 12 is a flow chart used for explaining a database renewal proceeding performed on the mate's e-mail address database by the transmission e-mail filtering means in the embodiment shown in FIG. 1 on the occasion of provision of a new variable open e-mail address.

When the variable open e-mail address is newly provided, the transmission e-mail filtering means 18 carries out the renewal of the mate's e-mail address database contained in the database portion 20 in accordance with, for example, sequential steps in a flow chart shown in FIG. 12.

Referring to the flow chart shown in FIG. 12, after a start, it is checked whether a variable open e-mail address has been newly provided to a communication mate having a predetermined e-mail address or not, at step 121. If not, the check at the step 121 is repeated until the variable open e-mail address is newly provided to the communication mate.

If it is clarified that the variable open e-mail address has been newly provided to the communication mate having the predetermined e-mail address as a result of the check at the step 121, a group of e-mails to which the predetermined e-mail address of the communication mate provided with the variable open e-mail address belongs are searched on the mate's e-mail address database contained in the database portion 20, at step 122. Then, it is checked whether the group of e-mails to which the predetermined e-mail address of the communication mate provided with the variable open e-mail address belongs has been registered on the mate's e-mail address database or not, at step 123.

If it is clarified that the group of e-mail addresses to which the predetermined e-mail address of the communication mate provided with the variable open e-mail address belongs has been registered on the mate's e-mail address database as a result of the check at the step 123, the process returns to the step 121. On the other hand, it is clarified that the group of e-mail addresses to which the predetermined e-mail address of the communication mate provided with the variable open e-mail address belongs has not been registered on the mate's e-mail address database as the result of the check at the step 123, the group of e-mail address to which the predetermined e-mail address of the communication mate provided with the variable open e-mail address belongs are newly registered on the mate's e-mail address database, at step 124. Next, at step 125, the variable open e-mail address provided newly to the communication mate is registered with a frequency in use of "1" on the mate's e-mail address database so as to belong to the group of e-mail address registered at the step 124. After that, the process returns to the step 121.

With the process described above, the renewal of the mate's e-mail address database contained in the database portion 20 is continuously carried out when the variable open e-mail address is newly provided to the communication mate.

As explained above, in the e-mail server 11 which constitutes the example of the e-mail server according to the first and second aspects of the present invention, with one or more of the peculiar open e-mail address, the variable open e-mail address, the e-mail address for communication mate validation and the e-mail address for validation in the time renewal system, which are selected as occasion demands and provided to the account for each member, the received e-mail filtering means 13 is operative to carry out the judgment on the received e-mail from the e-mail receiving means 12, the renewal of the mate's e-mail address database conducted on the occasion of the reception of the e-mail and the renewal of each of the delivery refusal history database and the black list database, and the transmission e-mail filtering means 18 is operative to carry out the e-mail processing including the processing on the transmission e-mail and the renewal of the mate's e-mail address database conducted on the occasion of the provision of the variable open e-mail address. Accordingly, with the e-mail server 11, the e-mail can be rapidly and smoothly communicated between the member belonging to the e-mail server 11 and the communication mate of the member, the member can make the contribution to the mailing list under the protection of function or performance for preventing the SPAMs from being received by the improved white list system, and in addition, the member's e-mail address or e-mail addresses of others can be surely prevented from undesirably leaking out when the e-mail from the member transmitted by the member's terminal apparatus is further transmitted.

APPLICABILITY FOR INDUSTRIAL USE

As apparent from the above description, the e-mail server according to the first and second aspects of the present invention can be applied widely to various e-mail systems as an e-mail server with which an e-mail can be rapidly and smoothly communicated between a member belonging to the e-mail server and a communication mate of the member, the member can make a contribution to a mailing list under the protection of function or performance for preventing SPAMs from being received by the improved white list system, and in addition, the member's e-mail address or e-mail addresses of others can be surely prevented from undesirably leaking out when the e-mail from the member transmitted by a member's terminal apparatus is further transmitted.

The invention claimed is:

1. An electronic mail server comprising:
electronic mail receiving means for receiving electronic mails,
received electronic mail filtering means for passing judgment on the electronic mail received by the e-mail receiving means,
electronic mail delivering means for delivering the electronic mail having been subjected to the judgment by the received electronic mail filtering means to one of mailboxes corresponding respectively to accounts of members affiliated with the electronic mail server in a mailbox portion,
electronic mail transferring means for transferring the electronic mail delivered to the mailbox to a member's terminal apparatus,
and
a database portion containing a mate's electronic mail address database on which a group of electronic mail addresses given to each communication mate are registered,
wherein said received electronic mail filtering means is operative to form a destruction judgment for deciding whether the electronic mail received by the electronic mail receiving means is to be destroyed or not and then form a delivery judgment for deciding whether the electronic mail received by the electronic mail receiving means is to be delivered or not on the basis of an addressee's electronic mail address of the electronic mail received by the electronic mail receiving means and at least one of sender's electronic mail addresses, electronic mail addresses for reply and destination electronic mail addresses contained in the electronic mail received by the electronic mail receiving means, said electronic mail delivering means is operative to deliver the electronic mail decided to be not destroyed as a result of the destruction judgment and further decided to be delivered as a result of the delivery judgment to the mailbox in the mailbox portion which corresponds to one of the accounts provided with an electronic mail address identical with the addressee's electronic mail address, and, in the case where the electronic mail receiving means receives a first electronic mail having the addressee's electronic mail address coincident with a peculiar open electronic mail address and then receives further a second electronic mail having the addressee's electronic mail address coincident with an electronic mail address for communication mate validation provided to the account on demand by the member with a predetermined time lag from the first electronic mail and it has passed a predetermined time after the electronic mail address for communication mate validation has been provided, said received electronic mail filtering means is operative to make a delivery permitting decision for causing the first electronic mail to be delivered when identification numbers inherent in each of the first and second electronic mails for identification are identical with each other and one of a plurality of electronic mail addresses which belong to the group of electronic mail addresses registered on the mate's electronic mail address database and corresponding to the electronic mail address for communication mate validation is coincident with one of source electronic mail addresses and the electronic mail address for reply of the first electronic mail address.

2. An electronic mail server comprising:
electronic mail receiving means for receiving electronic mails,
received electronic mail filtering means for passing judgment on the electronic mail received by the e-mail receiving means,
electronic mail delivering means for delivering the electronic mail having been subjected to the judgment by the received electronic mail filtering means to one of mailboxes corresponding respectively to accounts of members affiliated with the electronic mail server in a mailbox portion,
electronic mail transferring means for transferring the electronic mail delivered to the mailbox to a member's terminal apparatus,
and
a database portion containing a mate's electronic mail address database on which a group of electronic mail addresses given to each communication mate are registered,
wherein said received electronic mail filtering means is operative to form a destruction judgment for deciding whether the electronic mail received by the electronic mail receiving means is to be destroyed or not and then form a delivery judgment for deciding whether the electronic mail received by the electronic mail receiving means is to be delivered or not on the basis of an addressee's electronic mail address of the electronic mail received by the electronic mail receiving means and at least one of sender's electronic mail addresses, electronic mail addresses for reply and destination electronic mail addresses contained in the electronic mail received by the electronic mail receiving means, said electronic mail delivering means is operative to deliver the electronic mail decided to be not destroyed as a result of the destruction judgment and further decided to be delivered as a result of the delivery judgment to the mailbox in the mailbox portion which corresponds to one of the accounts provided with an electronic mail address identical with the addressee's electronic mail address, and, in the case where the electronic mail receiving means receives a first electronic mail having the addressee's electronic mail address coincident with a peculiar open electronic mail address and then receives further a second electronic mail having the addressee's electronic mail address coincident with an electronic mail address for communication mate validation provided to the account on demand by the member with a predetermined time lag from the first electronic mail and it has not passed a predetermined time after provision of the electronic mail address for communication mate validation, said received electronic mail filtering means is operative to make a delivery permitting decision for causing the first electronic mail to be delivered when one of a plurality of electronic mail addresses which belong to the group of electronic mail addresses registered on the mate's electronic mail address database and corresponding to the electronic mail address for communication mate validation is coincident with one of source electronic mail addresses and the electronic mail address for reply of the first electronic mail address.

3. An electronic mail server comprising:
electronic mail receiving means for receiving electronic mails,
received electronic mail filtering means for passing judgment on the electronic mail received by the e-mail receiving means,
electronic mail delivering means for delivering the electronic mail having been subjected to the judgment by the received electronic mail filtering means to one of mailboxes corresponding respectively to accounts of members affiliated with the electronic mail server in a mailbox portion, and
electronic mail transferring means for transferring the electronic mail delivered to the mailbox to a member's terminal apparatus,
wherein said received electronic mail filtering means is operative to form a destruction judgment for deciding whether the electronic mail received by the electronic mail receiving means is to be destroyed or not and then form a delivery judgment for deciding whether the electronic mail received by the electronic mail receiving means is to be delivered or not on the basis of an addressee's electronic mail address of the electronic mail received by the electronic mail receiving means and at least one of sender's electronic mail addresses, electronic mail addresses for reply and destination electronic mail addresses contained in the electronic mail received by the electronic mail receiving means, said electronic mail delivering means is operative to deliver the electronic mail decided to be not destroyed as a result of the destruction judgment and further decided to be delivered as a result of the delivery judgment to the mailbox in the mailbox portion which corresponds to one of the accounts provided with an electronic mail address identical with the addressee's electronic mail address, and, in the case where the electronic mail receiving means receives a first electronic mail having the addressee's electronic mail address coincident with a peculiar open electronic mail address and then receives further a second electronic mail having the addressee's electronic mail address coincident with an electronic mail address for validation in a time renewal system with a predetermined time lag from the first electronic mail, said received electronic mail filtering means is operative to make a delivery permitting decision for causing the first electronic mail to be delivered when identification numbers inherent in each of the first and second electronic mails for identification are identical with each other.

4. An electronic mail server comprising:
electronic mail receiving means for receiving electronic mails,
received electronic mail filtering means for passing judgment on the electronic mail received by the e-mail receiving means,
electronic mail delivering means for delivering the electronic mail having been subjected to the judgment by the received electronic mail filtering means to one of mailboxes corresponding respectively to accounts of members affiliated with the electronic mail server in a mailbox portion,
electronic mail transferring means for transferring the electronic mail delivered to the mailbox to a member's terminal apparatus,
and
a database portion containing a mate's electronic mail address database on which a group of electronic mail addresses given to each communication mate are registered,
wherein said received electronic mail filtering means is operative to form a destruction judgment for deciding whether the electronic mail received by the electronic mail receiving means is to be destroyed or not and then form a delivery judgment for deciding whether the electronic mail received by the electronic mail receiving means is to be delivered or not on the basis of an addressee's electronic mail address of the electronic mail received by the electronic mail receiving means and at least one of sender's electronic mail addresses, electronic mail addresses for reply and destination electronic mail addresses contained in the electronic mail received by the electronic mail receiving means, said electronic mail delivering means is operative to deliver the electronic mail decided to be not destroyed as a result of the destruction judgment and further decided to be delivered as a result of the delivery judgment to the mailbox in the mailbox portion which corresponds to one of the accounts provided with an electronic mail address identical with the addressee's electronic mail address, and, when each of the source electronic mail address and the electronic mail address for reply of the electronic mail received by the electronic mail receiving means, which is not coincident with any of the addressee's electronic mail address and the destination electronic mail address of the electronic mail received by the electronic mail receiving means, has not been registered on the mate's electronic mail address database corresponding to one of the accounts provided with the addressee's electronic mail address of the electronic mail received by the electronic mail receiving means, said received electronic mail filtering means is operative to register newly a group of electronic mail address on the mate's electronic mail address database corresponding to the account provided with the addressee's electronic mail address of the electronic mail received by the electronic mail receiving means and then register each of the source electronic mail address and the electronic mail address for reply of the electronic mail received by the electronic mail receiving means, which is not coincident with any of the addressee's electronic mail address and the destination electronic mail address of the electronic mail received by the electronic mail receiving means, with frequency in use representing 1 on the mate's electronic mail address database so as to belong to the group of electronic mail addresses newly registered on the same.

5. An electronic mail server according to claim 4, wherein, when a part of a party of the source electronic mail addresses and the electronic mail addresses for reply of the electronic mails received by the electronic mail receiving means, each of which is not coincident with any of the addressee's electronic mail address and the destination electronic mail address of the electronic mail received by the electronic mail receiving means, has been registered on the mate's electronic mail address database corresponding to an account provided with the addressee's electronic mail address of the electronic mail received by the electronic mail receiving means so as to belong to the group of electronic mail addresses, and another part of the party of the source electronic mail addresses and the electronic mail addresses for reply of the electronic mails received by the electronic mail receiving means, each of which is not coincident with any of the addressee's electronic mail address and the destination electronic mail address of the electronic mail received by the electronic mail receiving means, has not been registered on the mate's electronic mail address database corresponding to the account provided with the addressee's electronic mail address of the electronic mail received by the electronic mail receiving means, said received electronic mail filtering means is operative to register said another part of the party of the source electronic mail addresses and the electronic mail addresses for reply of the electronic mails received by the electronic mail receiving means with the frequency in use representing 1 on the mate's electronic mail address database so as to belong to the group of electronic mail addresses to which said part of the source electronic mail addresses and the electronic mail addresses for reply of the electronic mails received by the electronic mail receiving means belong.

6. An electronic mail server according to claim 5, wherein, when at least one part of the party of the source electronic mail addresses and the electronic mail addresses for reply of the electronic mails received by the electronic mail receiving means, each of which is not coincident with any of the addressee's electronic mail address and the destination electronic mail address of the electronic mail received by the electronic mail receiving means, has been registered on the mate's electronic mail address database corresponding to the account provided with the addressee's electronic mail address of the electronic mail received by the electronic mail receiving means so as to belong to the group of electronic mail addresses, said received electronic mail filtering means is operative to register each of the source electronic mail addresses and the electronic mail addresses for reply of the electronic mail received by the electronic mail receiving means, which is not coincident with any of the addressee's electronic mail address and the destination electronic mail address of the electronic mail received by the electronic mail receiving means, with the frequency in use representing 1 on the mate's electronic mail address database so as to belong to the group of electronic mail addresses to which said one part of the source electronic mail addresses and the electronic mail addresses for reply of the electronic mails received by the electronic mail receiving means belong.

7. An electronic mail server according to claim 6, wherein, when the frequency in use for each of the electronic mail addresses registered on the mate's electronic mail address database so as to belong to the group of electronic mail addresses has reached a numerical value more than a predetermined numerical value, said received electronic mail filtering means is operative to cause said frequency in use to be subjected to a division with a predetermined divisor and eliminate the electronic mail address on which a divided result of the division is smaller than 1.

\* \* \* \* \*